US012754986B2

(12) United States Patent
Douglas et al.

(10) Patent No.: US 12,754,986 B2
(45) Date of Patent: Oct. 6, 2026

(54) BIOMETRIC IDENTIFICATION PLATFORM

(71) Applicant: BIOCONNECT INC., Toronto (CA)

(72) Inventors: Robert Douglas, Toronto (CA); Ahsan Naqvi, King (CA); Pritesh Yogesh Patel, Burlington (CA); Chris Alexander, Toronto (CA); Bianca Lopes, Toronto (CA)

(73) Assignee: BIOCONNECT INC., Toronto, CA (US)

( * ) Notice: Subject to any disclaimer, the term of this patent is extended or adjusted under 35 U.S.C. 154(b) by 0 days.

(21) Appl. No.: 19/037,706

(22) Filed: Jan. 27, 2025

(65) Prior Publication Data

US 2025/0173416 A1 May 29, 2025

Related U.S. Application Data

(63) Continuation of application No. 18/623,887, filed on Apr. 1, 2024, now Pat. No. 12,248,552, which is a continuation of application No. 18/128,080, filed on Mar. 29, 2023, now Pat. No. 11,947,651, which is a continuation of application No. 17/573,383, filed on Jan. 11, 2022, now Pat. No. 11,620,370, which is a continuation of application No. 16/331,442, filed as application No. PCT/CA2017/051180 on Oct. 3, 2017, now Pat. No. 11,256,791.

(60) Provisional application No. 62/403,676, filed on Oct. 3, 2016.

(51) Int. Cl.

| | |
|---|---|
| ***G06F 21/32*** | (2013.01) |
| ***G06F 21/31*** | (2013.01) |
| ***G06V 40/70*** | (2022.01) |

(52) U.S. Cl.

CPC ............ *G06F 21/32* (2013.01); *G06F 21/316* (2013.01); *G06V 40/70* (2022.01)

(58) Field of Classification Search

CPC ........ G06F 21/32; G06F 21/316; G06V 40/70

See application file for complete search history.

(56) References Cited

U.S. PATENT DOCUMENTS

2004/0164848 A1 8/2004 Hwang et al.
2004/0219902 A1* 11/2004 Lee .......................... G06F 21/36 455/410
2008/0101658 A1* 5/2008 Ahern .................... G06V 10/70 382/115
2014/0366111 A1* 12/2014 Sheller .................. G06F 21/316 726/7
2015/0033305 A1* 1/2015 Shear ...................... G06F 21/57 726/11
2015/0310444 A1* 10/2015 Chen .................... G06Q 20/308 705/44

* cited by examiner

*Primary Examiner* — Amie C. Lin

(74) *Attorney, Agent, or Firm* — Price Heneveld LLP; Brian James Brewer

(57) ABSTRACT

An improved authentication, identification, and/or verification system is provided in various embodiments. The system is provided for use in relation to provisioning access or establishing identity in relation to one or more human users, and may be used in a single site/scenario/system, or across multiple sites/scenarios/systems. A combination of biometric modalities and authentication mechanisms having diverse characteristics are utilized to establish identity, the diverse characteristics being utilized to modify aspects of identity management and access provisioning.

18 Claims, 30 Drawing Sheets

| | | | | | |
|---|---|---|---|---|---|
| Contexual Data Layer | • Device ID<br>• OS Version<br>• Geolocation<br>• Geo Velocity<br>• Time of Day<br>• Day of Week | • Authentication Frequency<br>• Device Type<br>• Browser Type<br>• Browser Plugins<br>• Screen Resolution<br>• BioConnect hidden social network | • Connected Device Patterns<br>• Similar User Base Patterns<br>• Network Connection Patterns<br>• Device Settings<br>• IP Address Patterns<br>• Phone Number Verification+rep. | | |
| Passive Behavioural Bio Layer | • Accelerometer Patterns<br>• Gyroscope Patterns<br>• Mouse Patterns | • Touch Screen Interaction Patterns<br>• Touch Screen Pressure<br>• Health Data (Steps, Resting HR) | • Keystroke Analysis<br>• Page Navigation Patterns | | |
| Active Bio Layer | Bio 1<br>(Face) | Bio 2<br>(Voice) | Bio 3<br>(Eye) | Bio 4<br>(Finger) | Bio n<br>(Other) |

FIG. 7

Template initialized but cannot be used for verification id: $score_{(cap)}$:0 id: $score_{(max)}$:0

```
{active_bio:}
   face: }
      templates: []
         far:[]
         frr: []
         score.max: 50
         score.cap: 0
   eyes:
      templates: []
         far:[]
         frr: []
         score.max: 50
         score.cap: 0
```

Activate face enrollment in multifactor active biometric engine

```
{active_bio:}
   face: }
      templates: [".........."]
         far:[0.000001]
         frr:[0.00001]
         score.max: 50
         score.cap: 0
```

Activate eye enrollment in multifactor active biometric engine

```
{active_bio:}
   eyes: {
      templates: [″...........″]
         far:[0.0000001]
         frr:[0.0000001]
         score.max: 50
         score.cap: 50
```

Activate location sensor

```
{...
   context:{
      location: [{
         longitude: 36.50
         latitude: 45.90
         network: "bioconnect"
         score.cap: 30
         score.cap: 30]
```

Eyes, face, device, location templates enrolled and can be used for verification id.score: 140
(cap)
id.score: 200
(max)

Verification Request

Confidence
score: 50%
Face + Location
50 30
Total: 80

Confidence score: 64

Confidence score%: 80%

FIG. 18

```
face:{
  data:{
    feature_vector1:[..,..,..,..]
    feature_vector1:[..,..,..,..]
    feature_vector1:[..,..,..,..]
  }
  FAR: 0.000001

  matching.score: 90%
  avg_matching score: 92%
result:{success}

score: 49 (success(50), match deviation (98%)
```

FIG. 20

```
{
  location:{
    data:{
      long: 51.57
      lat: 0.12
      network: "bioconnect:
  }
likelihood: 50%
Score: 15
(maximum points (30)x likelihood (50%)
```

FIG. 22

BIOMETRIC IDENTIFICATION PLATFORM

CROSS-REFERENCE

This application is a Continuation of U.S. application Ser. No. 18/623,887 (now U.S. Pat. No. 12,248,552), filed on Apr. 1, 2024, which is a Continuation of U.S. application Ser. No. 18/128,080 (now U.S. Pat. No. 11,947,651) filed on filed Mar. 29, 2023, which is a Continuation of U.S. application Ser. No. 17/573,383 (now U.S. Pat. No. 11,620,370), which is a Continuation of U.S. application Ser. No. 16/331,442 (now U.S. Pat. No. 11,256,791), which is a 371 U.S. National Stage Application of PCT Application No. PCT/CA2017/051180 filed on Oct. 3, 2017, which claims benefit of U.S. Provisional Application No. 62/403,676, filed on Oct. 3, 2016, entitled "BIOMETRIC IDENTIFICATION PLATFORM".

All benefits, including priority, is claimed, and U.S. Application No. 62/403,676 is incorporated herein by reference.

FIELD

The present disclosure generally relates to the field of biometric identification or verification platforms, and more specifically, biometric identification or verification platforms configured to receive a plurality of different biometric/authentication data sets from a variety of biometric and authentication modalities, and adaptively provide improved verification by dynamically adapting biometric challenge requirements and responses in view of monitored contextual factors.

INTRODUCTION

Biometric devices and biometric modalities utilize a variety of interfaces and software development kits (SDKs). There is a large diversity in the types of products and services available, including in respect of their characteristics, platforms, and protocols. Existing access control and other identity verification systems are challenging to implement and typically do not flexibly adapt to changing circumstances.

Traditional biometric template data often includes a simple mathematical representation of a single biometric dataset, and is the only data the biometric software traditionally uses to compare against during a verification. The approaches are not robust or dynamic, and can be frustrating to users while providing inflexible approaches to security that are unable to adapt to malicious access or identity verification attempts. The biometric functionality often only acts as a basic gatekeeper, once a verification is complete, a user's identity is assumed to be authentic going forward. This can be problematic, where, for example, in a particular login session having administrative access, a malicious user is able to take over for an already authenticated user without further identity verification required by simply sitting down and using an unlocked computer after the initial user forgets to log out at the end of the session.

Accordingly, existing access control and other identity verification systems are typically not "fit for purpose" and either offer a level of security that is either too stringent or too lenient for a particular scenario (e.g., resulting in false rejections or false acceptances). The existing access control and other identity verification systems cannot be well "tuned" to optimize false rejections and/or false acceptance rates. Traditional biometric systems ignore these variances in matching scores, instead simply focusing on whether the match passes a static threshold set by the manufacturer. Analyzing patterns in these variances can significantly increase the accuracy of the biometric system, especially when combined with other identity factors.

Furthermore, the security is statically defined and does not adapt to changes over time, either in relation to external events, or a corpus of internal data. Existing systems are vulnerable to determined malicious users seeking to conduct security penetration by, for example, brute force approaches, approaches using newly identified zero-day/recently identified exploits (e.g., against unpatched users), conducting social engineering, exploiting hardware failures, reverse-engineered seeds for generating pseudo-random numbers, compromised network connections, among others.

Many smaller organizations do not have dedicated security teams, and security flaws may be unaddressed over time. Organizations typically are slow to share security/breach information with one another. Even where dedicated security teams are involved, there are human limitations as to how quickly a security team is able to respond to breaches and mitigate damage, while maintaining uptime of affected systems.

Accordingly, an improved flexible platform is desirable.

SUMMARY

An improved authentication, identification, and/or verification system is provided in various embodiments. The system is provided for use in relation to provisioning access or establishing identity in relation to one or more human users, and may be used in a single site/scenario/system, or across multiple sites/scenarios/systems. The system interoperates with a diverse set of identity data (e.g., including biometric enrollments, biometric templates, etc.,) that are captured in a data structure adapted for intelligent expansion and enhancement. In some embodiments, a level of unpredictability in authentication is intentionally incorporated by the system such that a potential malicious user has more difficulty understanding and modelling the challenges presented by the system.

Identity management and authentication can be used in various contexts, and is an important factor in providing access, conducting authentication, among others. For example, a user's rightful identity, once established, can be a valuable source of information and trust, especially as the identity is validated and reinforced over a period of time to generate a strong, cohesive profile that is not easily falsified. The profile can be used, for example, for maintaining strong security for controlling Internet of Things devices, providing access to applications, access to facilities, online banking, among others. Identity can be provisioned cross-platform and cross-organizations.

The improved system of some embodiments is configured to provide continuous authentication, whereby an identity data structure is continually updated throughout a specific user session. The user session may be associated with a temporary session identity score, in some embodiments, or the session identity score may be linked to an overall identity score for the user. The system is configured to track patterns/anomalies in passive authentication mechanisms (e.g., keystrokes, touch patterns, touch force), and increase or decrease the session identity score over a period of time. The session identity score is utilized to establish a period confidence score, and if the confidence score decreases below a confidence threshold, the user is presented with a set of challenges (e.g., biometric challenges) required to re-authenticate. The specific modalities for challenges (or combinations thereof) are selected by the system from a plurality of candidate modalities such that their weighted contributions to a confidence score is able to be considered in automatically selecting a basket or a combination of modalities to satisfy a challenge.

The automated selection process may take into consideration modalities available to a user, false acceptance rate, false rejection rates, processing time, correlations between modalities, a minimum required combination to achieve a particular confidence threshold, among others. The automated selection and presentation of modalities is designed to reduce a burden on user convenience without making major compromises to security. Further, the system of some embodiments is configured to track characteristics of the modality usage (e.g., network connection path, type of encryption) to reduce weightings of modalities that are highly correlated with one another as one compromised connection may compromise all modalities using the connection, for example. In some embodiments, the automated selection and presentation of modalities includes modifying attributes of the use of the modalities automatically to enhance security (e.g., requiring that the facial recognition verification on a mobile device is transmitted through a cellular network instead of the same wireless network that is connected at an organization to a wall-based fingerprint sensor, the authentication being sent across two different pathways).

Authentication may be conducted on a continuous basis, whereby a session based identity score is continuously refreshed through the course of a sessions to monitor for changes in the attributes. For example, if the session-based identity score falls below a particular confidence threshold requirement, the user may be required to satisfy further authentication challenges to raise the confidence level above the threshold again. In some embodiments, the session-based identity score is configured to be degraded over time.

In some embodiments, a scalable system is provided whereby the underlying computer infrastructure is configured to add or subtract processing nodes to maintain a minimum performance threshold or a maximum processing time threshold. Confidence score requirements may be maintained, but computational resources may be dynamically increased and requested pre-emptively in view of expected load from expected levels of challenges, and load balancers and policy engines can be triggered to request computing resources, such as processors, clusters, network connection bandwidth, among others.

The system may be configured for local matching (e.g., a local copy of a profile template stored locally on a device), or for server-side matching (e.g., a server copy of the profile template maintained in a cloud or other remote storage), or a combination of both. Local matching may be beneficial from a processing time/load distribution perspective, where there are a large number of different underlying computing devices. Similarly, the system may also be configured for 1:n matching (e.g., identity not required) in addition to 1:1 verification. Where local matching or 1:n matching is utilized, the system is configured to reduce a confidence score to reflect the reduced trust level associated with local matching or 1:n matching (for 1:n matching, loss of security may be proportional to the value of n). Local matching can be utilized for example, where there is intermittent, poor or no connection, but the system should be able to reduce security weightings accordingly based on the increased ease of malicious access.

In some embodiments, the system is utilized as a type of "global" identity verification mechanism that spans many otherwise disparate systems and organizations (e.g., the system may operate for banks A-E, retailers F-G, and government systems H-J, establishing identity across all of these disparate systems, and collecting and collating event information across all systems to provide a cohesive identity management system). The system provides a holistic identification platform that tracks user inputs over time to establish a "rightful identity" on a maintained data structure that receives, as inputs, results and information related to authentication events. Improved identity assurance is possible as a portable, cross-platform "identity score" is established and maintained over time using an enhanced data record that helps a user and organizations manage physical access, cybersecurity, and identity assurance risks, among others. The enhanced data record is maintained through harvesting information obtained at each underlying organization or computing system, and feeding them to a central system that tracks a holistic view of the "rightful identity" of the user.

Access or identity verification can be conducted on a one-time or an on-going, continuous basis. For example, a verification may occur at the login into a webpage, and only then. In another example, the verification occurs periodically or continuously for the user despite being logged in, and verification may be stepped up or stepped down responsive to various tracked factors, such as suspicious mouse behavior, request for services requiring higher level access beyond a login, etc.

In some embodiments, the actual personal information/enrollment information is held locally at specific identity systems and organization computer systems and not shared with the central system, but rather, a sanitized, redacted information container of successful and failed verifications, and related characteristics thereof (e.g., using one-way hash algorithms to remove identifying information) are provided to the central system to continually update and manage the "identity score". The overall "identity score" can then be communicated for consumption by the underlying identity systems as a factor in automated assessments of whether access should be provisioned or not.

The system can be provided using one or more processors coupled to computer readable media, interface devices, having computer-readable instructions, which when executed, cause the processors to perform one or more computer-implemented methods. The system includes data storage maintaining one or more data structures, which may be enhanced over time with tracked data sets, access attempts/successes, among others. The data structures may store user profiles, and the user profiles may include, among others, identity scores, enrollment information, past attempts, time-coded series data, discrete event data, among others.

In some embodiments, for various modalities, false acceptance rate and false rejection rate data is provided by solution vendors and combinations of the false acceptance rate and false rejection rate data are utilized to assess an overall challenge confidence level required for a particular application, identity verification, or access provisioning request. In further embodiments, the false acceptance rate and false rejection rate data for particular modalities may be verified empirically over time by tracking actual vs. expected false acceptances and false rejections, and the system may include a data structure of biometric modality characteristics that may be updated over time to reflect more accurate false acceptance and false rejection rates, or to indicate trends indicative of changing false acceptance and false rejection rates (e.g., the fingerprint sensor having identification number F15 has increased false rejection rates due to smudging of the sensor and likely needs to be replaced).

The system, in some embodiments, is a physical appliance that resides at one or more data centers, for example, in the form of an interconnected rack server that is configured for managing identity information and respond to identity challenges across an application programming interface (API), and may interoperate with or provide directory services, domain controller services, certificate management, etc. The system may interoperate with various physical or virtual access control mechanisms, such as door controls, elevator controls, physical locking/unlocking mechanisms, password/credential managers, root access provisioning, user account control (UAC) technologies, etc. In other embodiments, the system is a cloud-based system whereby computing systems of one or more organizations are able to connect to the system to perform identity challenges, and to receive, in the form of encoded electronic signals, responses of whether an identity challenge is met or failed.

The improvement is directed to the flexible usage of multiple available mechanisms for authentication, where a combination of multiple mechanisms is intelligently utilized together to dynamically address threats and control access/identity verification. Identity can be established by way of successive successful identity challenges, with further verifications to satisfy increased challenge requirements for high-impact or highly secured access/identification requirements. Furthermore, the system is configured to dynamically adapt to changes resulting from the passage of time, such as the aging of biological signatures and other authentication mechanisms (e.g., dynamically reducing a confidence score on older enrollments of data based on known biometric enrollment degradation characteristics).

An overall identity score may be maintained in a data structure associated with user profiles, and the overall identity score may be utilized to track, over a period of time, how suspiciously or trustworthy the system finds a particular user, based on historical events. Similar to a "credit score" the tracked "identity score" may be adapted for increasing or decreasing responsive to events that occur in relation to the user (or users with a similar demographic as a user). The "identity score" may thus be tracked as a time-series data set of prior challenge successes and failures, and an overall "identity score" is maintained in a data structure over a period of time. For example, when the "identity score" is slightly increased with every successful fingerprint scan when compared to a biometric fingerprint enrollment template, and significantly increased with every successful fingerprint scan with a contemporaneous token entry. Conversely, the "identity score" is decreased slightly with every failure, and significantly decreased with an identified breach on the user's account.

The "identity score" can be utilized in weighing confidence scores associated with successful challenges, whereby, for example, a user whose profile is constantly under attack by malicious users and having a very low "identity score" would automatically have enhanced challenge requirements (e.g., a user whose username is the user's email, and the user's email is listed as an administrator of a website on a public WHOIS database, is typically subject to an incredibly large number of attacks in any given day, as malicious users have identified such a username as a high value target). Conversely, a very private individual who has had a large number of successful challenges on his/her private information with very little indication of false attempts would have a higher "identity score". The "identity score" is useful in similar contexts as a "credit score". New users may be associated with an initial low "identity score" that the user can build over a period of time.

In implementations where the system is utilized as a type of "global" identity verification mechanism that spans many otherwise disparate systems and organizations, the "identity score" is of particular importance and value. The "identity score" on the profile stored on the global identity verification mechanism can thus be utilized as a type of cross-platform evaluator metric that is helpful in informing an estimation of the "real identity" of a user.

A potentially important use case would be where a user is unknown to a particular organization, but the system is able to apply the global "identity score" to help the organization determine whether a user is particularly trustworthy or untrustworthy. Similar to the value of a credit score for new immigrants to a particular country, users may be incentivized to build a good "identity history" over a period of time, for example, by utilizing leading cybersecurity practices, as poor cybersecurity practices may lead to a bad "identity history". For example, a user who uses a 4 number password, does not recycle them, and freely posts his/her password on public forums may have a terrible "identity score", and organizations connected to the system automatically require immensely difficult challenge confidence scores for provisioning access to such a user.

A user could, for example, utilize an interface to assess the user's own "identity score" to validate, for example, how trusted the user's identity is or how compromised the user's identity is relative to external attempts to impersonate the user. An organization can utilize the "identity score" to identify frequently "hit" targets within an organization, and take responsive steps to mitigate the frequency of being "hit".

The multiple available mechanisms for authentication includes biometric modalities and other mechanisms, and gathered contextual information in the form of data sets are utilized to fine tune responses to identity challenges. For example, biometric modalities may be used as a primary input, and contextual information is utilized to determine how trustworthy even a successful biometric input is in relation to the type of access being requested. Different types of challenge are considered to have different contributions to a confidence score. In some embodiments, the system is configured to selectively request 1:n matching and 1:1 verifying approaches based on identified contextual factors, as 1:n matching is less secure but more convenient, and 1:1 verifying is more secure but less convenient. In some aspects, the selection of 1:1 or 1:n is based on availability of computing resources and a convenience factor, and a weighted confidence score is generated to reflect the reduced security of a 1:n match (e.g., may be suitable for a basic login, but not for authorizing a change in signatory).

The difficulty level of a challenge may be dynamically modified and tied to false acceptance and false rejection rates. For example, a transfer of $1 MM USD may require a higher level of challenge and a transfer of $1.00 USD may require a very low level of challenge. Accordingly, in some embodiments, where sufficient contextual information is gathered, there may be determination of whether a challenge is necessary at all (e.g., there may be no need to provide biometrics at all given an earlier authentication).

Conversely, where sufficient contextual information is gathered, there may be determination that a stricter level of challenge is required. For example, there may be extremely sensitive access being provisioned, and in additional to passively tracked contextual information needing to be highly consistent, a series of successive biometric challenges are put into place to build up to the required confidence score. In these situations, it is possible that 2 or more biometric challenges are required, and the system may actively modify various characteristics of the challenges to make them more or less stringent as required (e.g., forcing routing of credentials through a specific network, forcing server-side processing).

For example, features of contextual information may include passively tracked information, such as connected network, surrounding WiFi network SSIDs, time of use, geolocation, hand grip, gait (as measured by a gyroscope or accelerometer), finger position, applied pressure, among others. Where an anomaly is detected, a challenge may require a higher confidence score to account for the potential that an identity is suspect. There may be some anomalies that simply indicate that no level of confidence is acceptable (e.g., a user who is known to be in Washington, D.C. at a certain time utilizes an IP address based in London, England five minutes later, and there is no practical way in which the user could have transported himself or herself there within the allotted time).

Where a stricter level of challenge is required, the system is configured to dynamically suggest additional challenge mechanisms. Each successful mechanism contributes to an overall challenge score that is required to be overcome before access can be provisioned or an identity is verified. Where multiple challenge mechanisms are utilized, the system, in some embodiments, modifies a contributed confidence score between the additional mechanisms based on correlated characteristics in relation to the challenge mechanisms.

Characteristic correlation between modalities may be undesirable, especially where very sensitive or access to highly secured information/facilities is required (e.g., where two modalities share a network connection path, are obtained from a same device, utilize the same encryption/secure hash algorithms).

The system may reduce confidence for additional modalities where there is high correlation, or suggest mechanisms to decrease correlation. Conversely, the system may increase confidence for additional modalities where there is low correlation. Correlation is automatically tracked, and weightings are automatically applied free of human input. In some embodiments, weightings applied to correlations are tuned over a period of time as the system encounters false positives, false negatives, and patterns are identified based on correlations (e.g., when an Android device is compromised, there is a likelihood that all modalities on the device have become compromised).

For example, a system admin seeking to request a root access into a corporate data center server may utilize a biometric facial scan from a scanner built-in to the wall at the data center as a primary mechanism, operating on a network having an SSID of "data_center". Root access is designated as requiring an extremely high challenge score, and the successful facial scan is insufficient, and the system requests a fingerprint scan using the user's mobile device. However, the user's device is connected to the network having an SSID of "data_center" and information would be transmitted across the same network, increasing a correlation with the facial scan. The system identifies this correlation as problematic (by way of reducing weight of a successful fingerprint scan), and suggests that the user turn off WiFi, and transmit the fingerprint scan instead over cellular so that the correlation in the networking paths is no longer existent. When the user turns off WiFi and sends the successful fingerprint scan, the user is able to obtain root access, as the combination of the uncorrelated successful facial scan and fingerprint scans are able to successfully overcome the heightened challenge requirement.

In some embodiments, the system is designed for usage for a large number of different organizations and/or physical locations. Population level information may be extracted in relation to false acceptances, false rejections, among others, and encapsulated containers of pattern recognition information relating to the veracity of biometric modalities, contextual factors, patterns of correlations, etc. may be fine-tuned across different locations. For example, for a new installation, rather than having the new installation develop its own corpus of training data and refinements, the new installation may simply adopt training sets based on training data of other sites in a similar geographic region and/or of a similar type (e.g., physical access control for nuclear power plants).

Similarly, breach information and other pattern anomalies may be communicated in the form of encapsulated data containers that are propagated from time to time or on the basis of major incidents/patterns such that all connected organizations and/or physical locations become aware of breaches. The breach information or other pattern anomalies may provide a "head start" for organizations to pre-emptively adapt to issues that occur at other facilities. For example, if a serious vulnerability is found, for example, in a cryptographic software library used for SSL/TLS encryption, while some initial sites may be successfully breached, the system may, for other sites, dynamically modify challenge requirements responsive to the breach (e.g., passwords are applied a new weighting of 10% towards a confidence score, and additional modalities, such as fingerprints are dynamically required as a successful password entry is no longer sufficient to satisfy a challenge).

Some embodiments, of the system are configured to address time-related degradation of biometric enrollments. As users age, the quality or acceptability of their biometric enrollments may become increasingly suspect (e.g., the fingerprint of a 10 year old may begin showing deviations as the child becomes an adult, and eventually a senior).

Accordingly successful challenge weightings (e.g., confidence scores) may be reduced responsive to aging, and/or new enrollments can be requested based on an earlier enrollment becoming insufficient to address a challenge. Similarly, even without age-related effects, lower quality enrollments can be accounted for by reducing a confidence score associated with a successful biometric challenge.

In an aspect, an adaptive biometric verification system is provided for provisioning identity verification in relation to the identity of one or more users, the system automatically adapts user identification decisions to an user identification challenge request based on one or more extracted patterns of behavior, the adaptive biometric verification system comprising: a data receiver configured to receive one or more biometric information data sets obtained from one or more biometric sensor devices; a template persistence engine configured to maintain, for each user, an enhanced reference template data structure recording at least (i) biometric template data based on previous received biometric information data sets, (ii) tracked contextual identity data, and (iii) identified usage patterns based on the tracked contextual identity data; a pattern recognition engine configured to generate identified usage patterns representative of the one or more extracted patterns of behavior based on the tracked contextual identity data to generate one or more identity attributes associated with each tracked contextual identity data type, the one or more identity attributes representative of a correlation with tracked user profile information stored on the enhanced reference template data structure; a challenge processing engine configured to receive the user identification control challenge request and to receive the one or more biometric information data sets, and upon each successful verification against the biometric template data maintained on the enhanced reference template data structure, the challenge processing engine is configured to modify a baseline confidence contribution score from each successful verification in accordance with the one or more identity attributes to generate an adapted confidence score aggregated from each baseline confidence contribution score; and responsive to the adapted confidence score exceeding a required confidence score threshold, the challenge processing engine is configured to generate a response signal representing that the user's identity has been successfully verified.

In an aspect, the system further includes: a continuous verification engine configured to, following an initial successful verification, maintain, for each user during one or more corresponding authentication sessions, a sessional confidence score on the corresponding enhanced reference template data structure for the user, the sessional confidence score initially populated with the adapted confidence score; the pattern recognition engine further configured to generate the identified usage patterns during each of the one or more corresponding authentication sessions, the generated identified usage patterns utilized to periodically adapt the sessional confidence score to adjust the sessional confidence score to adapt for identified anomalies of tracked behavior; and the continuous verification engine further configured to, responsive to the sessional confidence score falling below a required sessional confidence score threshold, generate a control signal instructing the challenge processing engine to automatically issue one or more additional user identification control challenge requests and responsive to one or more successful verifications, increase the sessional confidence score based on an adapted confidence contribution score from each successful verification; responsive to the sessional confidence score falling below the required sessional confidence score threshold for a pre-defined duration of time or falling below the required sessional confidence score by a pre-defined threshold, the challenge processing engine is configured to generate an updated response signal representing that the user's identity is no longer successfully verified.

In an aspect, the continuous verification engine is configured to incrementally reduce the sessional confidence score responsive to a time elapsed from a last previous successful biometric verification.

In an aspect, the pattern recognition engine is configured to incrementally increase the sessional confidence score responsive to a detected consistency in the identified usage patterns.

In an aspect, the pattern recognition engine is configured to continuously monitor, any one of: (i) frequency of keystrokes, (ii) mouse pointer movements, (iii) average force applied on touch inputs, (iv) touch input selection positions on relative to positioning and size of one or more visual interface elements, (v) gyroscope readings, (vi) accelerometer readings, (vii) gait inputs, (viii) hand movements, (ix) hand grip, and (x) or any combination thereof.

In an aspect, the system further includes a global identity management engine configured to, for each user of the one or more users, maintain an initial global identity score derived based on the completeness of enhanced reference template data structure for the corresponding user, and to maintain an adapted global identity score adapted based on a corpus of successful or unsuccessful verification attempts.

In an aspect, the adapted confidence score is further adapted based on the adapted global identity score corresponding to the user requiring verification.

In an aspect, the global identity management engine is configured to maintain one or more identity tokens each associated with a corresponding user of the one or more users, the one or more identity tokens generated as a hash value derived from the (i) biometric template data based on previous received biometric information data sets, (ii) tracked contextual identity data, and (iii) identified usage patterns based on the tracked contextual identity data from the enhanced reference template data structure, each identity token of the one or more identity tokens being configured for processing by a downstream computing system to increase a weighting applied in generating with downstream adapted confidence scores by the downstream computing system.

In an aspect, the pattern recognition engine is configured to monitor population-level characteristics of usage patterns across one or more subsets of the one or more users, and monitored deviations from the population-level characteristics are utilized to reduce the baseline confidence contribution score from each successful verification.

In an aspect, the challenge processing engine is further configured to modify the baseline confidence contribution score from each successful verification based on an enrollment quality of the biometric template data maintained in the enhanced reference template data structure.

In an aspect, the challenge processing engine is further configured to reduce the baseline confidence contribution score based on an elapsed time between enrollment of the biometric template data maintained in the enhanced reference template data structure and a present time.

In an aspect, the challenge processing engine is further configured to adaptively reduce the baseline confidence contribution score based on identified age-related biometric enrollment degeneration metrics for corresponding to the biometric template data.

In an aspect, at least two different biometric information data sets are provided from the user, and responsive to each successive verification of successive received biometric information data set following a first successful verification, the challenge processing engine is configured to reduce the corresponding baseline confidence contribution score based on an identified level of correlation identified between underlying communication infrastructure corresponding to each of the one or more biometric sensor devices utilized in earlier successful verifications.

In an aspect, the system further includes a biometric modality selection engine configured to, responsive to automatically determine a subset of required biometric information sets to be obtained from a subset of the one or more biometric sensor devices such that, the subset of required biometric information sets determined such that assuming each successful verification against the biometric template data maintained on the enhanced reference template data structure is successful, the adapted confidence score will exceed a required confidence score threshold.

In an aspect, the biometric modality selection engine is configured to select an optimal subset of required biometric information sets from one or more candidate subsets of required biometric information sets, the optimal subset selected based on a ranking of the one or more candidate subsets of required biometric information sets maintained in a data structure configured to track rolling average processing times associated with conducting verifications on the one or more biometric sensor devices, the optimal subset minimizing an estimated overall processing time required to obtain the required biometric information sets.

In an aspect, the biometric modality selection engine is further configured to maintain a data structure indicative of the communication infrastructure characteristics of each one or more biometric sensor devices, and wherein the one or more candidate subsets include variations of usage of the one or more biometric sensor devices having variations of the communication infrastructure characteristics.

In an aspect, the biometric modality selection engine is further configured to automatically modify the communication infrastructure characteristics of at least one of the one or more biometric sensor devices to reduce the identified level of correlation identified between underlying communication infrastructure corresponding to each of the one or more biometric sensor devices utilized in earlier successful verifications.

In an aspect, the modified communication infrastructure characteristics includes at least one of (i) a network service set identifier (SSID), and (ii) a communications pathway.

In an aspect, the identified usage patterns based on the tracked contextual identity data include at least tracking a level of clustering in geolocation data, and where a high level of clustering is found in the geolocation data in one or more geolocation clusters, usage patterns identified outside the one or more identified geolocation clusters are estimated to be anomalies and utilized to reduce the baseline confidence contribution score for a corresponding successful verification.

In an aspect, the system is configured for parallel processing using a plurality of processing pipelines, wherein a first processing pipeline is utilized for receiving the biometric information data sets, a second processing pipeline is utilized for receiving time-encoded contextual identity data, and a third processing pipeline is utilized for receiving event-encoded contextual identity data.

In an aspect, the baseline confidence contribution score from each successful verification is inversely proportional to a false acceptance rate associated with the corresponding biometric sensor device of the one or more biometric sensor devices.

In an aspect, the false acceptance rate for each biometric sensor device of the one or more biometric sensor devices is initially estimated based on manufacturer specifications.

In an aspect, the system further includes a biometric modality monitoring engine configured to maintain a modality tracking data structure tracking the false acceptance rate (FAR) associated with usage of the one or more biometric sensor devices.

In an aspect, the estimated overall processing time required to obtain the required biometric information sets is based on both a time required for processing successful verifications and an inconvenience time factor associated with a false rejection rate (FRR) associated with the corresponding biometric sensor device.

In an aspect, the challenge processing engine is configured to reduce the baseline confidence contribution score from each successful verification for any biometric information data sets where 1:n matching is utilized using at least a false rejection rate proportional to a value of n.

In an aspect, the challenge processing engine is configured to reduce the baseline confidence contribution score from each successful verification for any biometric information data sets where local matching is utilized.

In an aspect, for each verification of the one or more biometric information data sets, the challenge processing engine is configured to select either verification against a local copy of the enhanced reference template data structure residing on the corresponding user's computing device and a server copy maintained on a server-side data storage by the template persistence engine, or a combination of both the local copy and the server copy, and the challenge processing engine is configured to reduce a baseline confidence contribution score from each successful verification conducted against the local copy of the enhanced reference template data structure.

In an aspect, for each verification of the one or more biometric information data sets, the challenge processing engine is configured to select either verification against a local copy of the enhanced reference template data structure residing on the corresponding user's computing device and a server copy maintained on a server-side data storage by the template persistence engine, or a combination of the local copy and the server copy; the challenge processing engine is configured to reduce a baseline confidence contribution score from each successful verification conducted against the local copy of the enhanced reference template data structure; and the one or more candidate subsets include variations whereby the one or more biometric information data sets are processed by verification against different variations of using verifying against the local copy, the server copy, or both the local copy and the server copy.

In an aspect, the one or more biometric sensor devices include at least one retinal scanners, fingerprint scanners, voice scanners, and facial scanners.

In an aspect, the contextual identity data include at least one of user input device usage characteristics, physiological data, geolocation data, and network connectivity data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 7 is an example data structure diagram of information stored in relation to a particular user, according to some embodiments. As shown in FIG. 7, there may be contextual data, passive behavioral data, active biometrics layers, among others.

In FIG. 10, the geolocation data has a strong correlation with one another, and a higher weighting is applied to geolocation data that matches the pattern as there is a stronger identity influence estimated based on the tracked data set over a period of time.

FIG. 18 is an example listing of confidence score in the context of a comparison against a required confidence score, according to some embodiments.

FIG. 20 is an example weighted confidence score where a successful result is modified in view of match deviations, according to some embodiments.

FIG. 22 is an example enhanced structure whereby the geolocation likelihood modifies the confidence score, according to some embodiments.

DETAILED DESCRIPTION

Figure 1A:
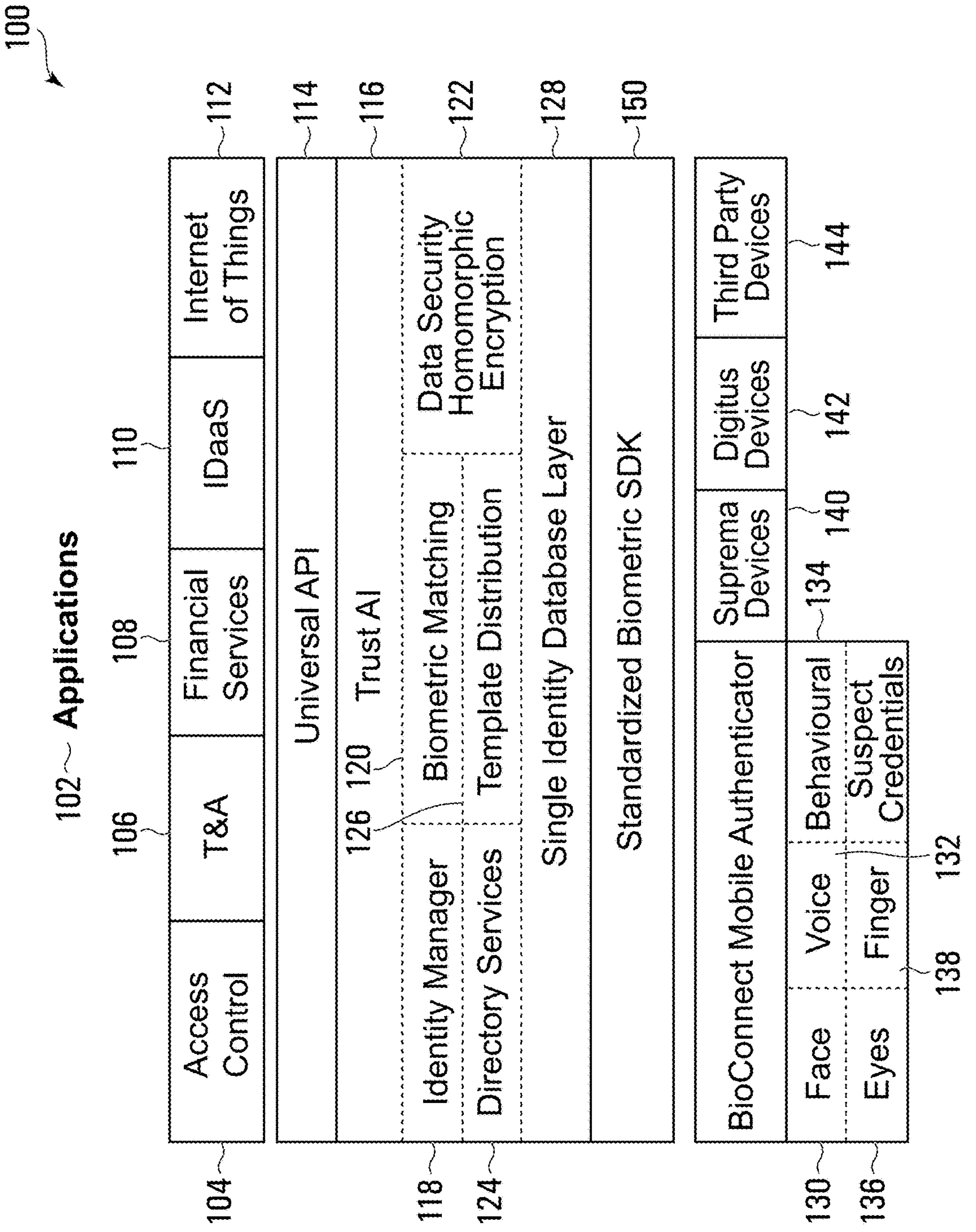
FIG. 1A is an example schematic of a system stack for a system configured for the processing of a plurality of biometric information data sets, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Biometric devices and biometric modalities utilize a variety of interfaces and software development kits (SDKs). There is a large diversity in the types of products and services available, including in respect of their characteristics, platforms, and protocols. Biometric modalities are intrinsically related to the identity of an individual or group of individuals. Biometric modalities, for example, include fingerprints, retinal scans, olfactory information, facial measurements, DNA, gait, speech patterns, heartbeat, respiratory rate, among others, and are often related to unique and/or identifying personal characteristics. These personal characteristics are often immutable or difficult to change, and serve to distinguish between individuals.

Biometric modalities are captured by biometric devices, which are typically electronic devices that are configured to capture biometric information using one or more sensors. These electronic devices are incorporated into various apparatuses, such as door sensors, mobile computing devices (e.g., smartphones, tablets, laptops), computers, customs clearance sensors, etc. However, biometric identification is not perfect and can be prone to false positives, false negatives, poor calibration, incomplete information, non-unique matching, among other challenges. Accordingly, a single modality will rarely work for all users within a particular application. In some cases, active biometric template data continue to be updated through use, increasing the accuracy of the unique data points associated with the face, finger, eye, or voice (and more). For example, noisy environments cause computational difficulties for voice biometrics, religious beliefs may prevent some users from using face biometrics, a user could have lost an eye preventing the use of eye/iris biometrics, among other reasons, and it may be beneficial to be able to seamlessly utilize a variety of different types of biometric modalities and/or capture solutions such that an individual can be correctly identified at a higher rate of accuracy, or using reduced computational ability.

In addition to fine-tuning the captured biometric data, analysis can also be performed on the matching results over time. Many users will have consistency with their biometric match performance, and this can be influenced by the user's unique biometric traits, matching techniques, and even the environment that the user is matching in. Every time a match occurs, a match score is generated. If a user typically matches between 90-100% on average, a match score of 82% while still being accepted but the algorithm will yield a lower influence weight on the overall confidence score generated for the verification. This indicates additional risk, and could require the user to seek additional authentication methods to meet the level of confidence required for the application.

Technical challenges arise especially where two or more modalities are utilized. For example, the workload to implement a solution is doubled in view of the data sets, and complexity of maintaining the integration of the modalities increases. This increased complexity can significantly add to costs and complexities associated with adopting biometric technology.

However, the use of multiple modalities and devices may be helpful wherein differences and diversities in their characteristics can be leveraged by a platform to obtain improved results. For example, if four different biometric data sets are available, each associated with a different modality and different method of capture, known characteristics about the processing requirements, reliability, accuracy, specificity, etc., can be utilized to advantageously process the biometric data sets such that the trusted identity of a user can be verified within an acceptable level of confidence/accuracy, and in alignment with a minimum trust requirement (e.g., trust requirements may vary based on consequences of mistaken identity).

Reduced computational requirements may be possible, or reduced processing time in view of a finite amount of computational resources. The speed of assessment is a relevant consideration as convenience is a factor for adoption of the technology. The system is configured to centralize a user's identity in a single, accessible data structure, linking attributes that help identify an individual, and creating the link to applications that require identity verification. Identity verification can be used for various purposes, such as provisioning access control (both physical and virtual), authorizing transactions (e.g., in a financial sense), providing control (e.g., to operate a vehicle), among others.

Identity verification is an important feature in modern computing systems, as malicious and/or unauthorized access is a serious concern. Basic biometric template systems are available (e.g., fingerprint scanners), along with conventional facility access systems (e.g., swipe cards), but conventional solutions are typically separate from one another and provide a one-size fits all approach to identity verification.

In contrast, in accordance with some embodiments, an improved system is described whereby identity management is performed by way of maintaining one or more enhanced data structures that establish an identity template that is configured to become populated with information and strengthen as it learns more about a user (or unauthorized access attempts and/or breaches) through identity interactions. A computing engine that analyses all data to extract patterns of identity is referred to as Trust AI, and in some embodiments, is a policy engine that adaptively processes authentication requests by way of authentication challenges. Where the system cannot automatically assess identity, a number of successful responses to authentication challenges are required for the system to establish that the user is whom the user purports to be. As described in various embodiments, the improved system can be configured to utilize contextual factors and other data sets to dynamically determine a level of difficulty required to satisfy the system, or modify weightings of successful responses to more accurately reflect contribution to a determination of a rightful identity.

Through effective machine learning techniques and a corpus of learning data, Trust AI becomes effective at identifying strong correlations within data captured about a user, as well as identifying when anomalies are occurring that contradict previously captured patterns. This enables the system to automatically estimate risk associated with an authentication event, creating stronger authentication for applications.

The use of multiple modalities and devices and their known characteristics is also beneficial where a particular modality, protocol, or capture type is compromised, or becomes no longer available. For example, if a biometric partner were to go out of business, be acquired, or if the technology were hacked or spoofed, it would be important that a solution is able to utilize alternate options, or take the impact of such an event into consideration. Compromised or out of date information, for example, may be considered usable for a period of time (e.g., confidence score is set to exponentially decay with time), unusable until validated (e.g., turns out the data infiltration was only able to obtain hashed values of passwords and not the underlying passwords), completely unusable (e.g., the fingerprint sensor's communication pathway was compromised), etc. Information may be dynamically monitored and/or automatically reweighted to take into consideration these factors, and may also vary on externally obtained data, such as weather, time of day, parsed news events, network security events, etc.

In some embodiments, convenience of usage may be targeted as a factor that is statically set such that the difficulty/security level of a potential solution is modified over time. A feedback loop may be utilized wherein a level of success is maintained by varying a security level associated with access to a particular system. For example, if a system detects a low level of successful matches, the system may reduce the security level gradually in response (within a predefined threshold) such that success is less onerous. Conversely, the system, after detecting a high level of successful matches, may gradually increase a security level in response such that success requires more onerous biometric requirements.

FIG. 1A is an example schematic of a system stack for a system configured for the processing of a plurality of biometric information data sets, according to some embodiments. Corresponding methods, and non-transitory computer readable media are also provided.

FIG. 1A illustrates a platform 100 where a number of different applications 102 (e.g., access control 104, time and attendance systems 106, financial services platforms 108, Identity-as-a-Service (IDaaS) platforms 110, Internet of Things devices 112 are configured to electronically communicate with a biometric information processing platform 100 through a universal API 114.

Access control 104 may refer to, for example, facility access systems that are configured for receiving biometric inputs and using the outcome of an identity match or verification to provision or de-provision access to a facility (e.g., warehouse, office, parking lot), area (e.g., secured section), object (e.g., cabinets). Such systems include electronic contacts and triggers that are operable to control locks, doors, barriers, among others. The level of security may vary depending on the type of access—highly secured facilities may include areas with servers housing sensitive data, and less secured facilities may include storage units in a storage complex. There may be a mixture of different security levels for access in a single facility. Access control may also extend to virtual systems, including virtual private networks, file systems, etc. For example, access control may apply differently to administrative actions, or even more granularly, may be determined at the level of an operation and/or the number of files being impacted by a particular operation.

In conventional access control systems, access is typically provisioned through the use of a specially configured pass card (e.g., a card having RFID technology). A weakness of such access control systems is that the access control modality is prone to compromise and the consequences of compromise are difficult to control relative to the access granted. For example, an employee who is on his/her first day at the job may be given a pass card, which the employee then uses to enter the facility overnight and steal sensitive information. Further, where a RFID verification method is compromised, a malicious user may easily clone or otherwise create falsified passes that provide for unauthorized access.

Such access systems typically do not have a strong indication of the identity of the individual aside from an account number associated with the card, and even where unauthorized access is indicated, it often cannot be easily traced to a true identity of an individual. For example, another user may steal an employee's card, and use it for access. The conventional access system merely tracks the ID of the stolen card, which is a compromised suspect identity. There is simply not enough information to identify the identity of the user that stole the card and used it for access.

In contrast, some embodiments are adapted to intelligently combine and utilize the diversity of characteristics of a plurality of modalities and biometric data information such that increased access security may be provisioned for a facility.

Time and attendance systems 106 may include resource tracking systems adapted to determine if resources (e.g., workers) are present at a facility, for example, during work hours or in relation to a particular task. The systems may require a fairly high level of accuracy as the determination of the real identity of a resource may be important in relation to compensation being paid to the resource, etc. For example, factory workers may utilize a facial recognition system that identifies them when starting and ending a shift, tracking the total hours worked to ensure that fair compensation is paid and that workplace regulations regarding maximum number of hours worked are complied with. A challenge with conventional time and attendance systems is in relation to the falsification of identities or inaccurate identification of identities. In the event of such a scenario, remuneration may not be accurately tracked.

Financial services platforms 108 may include financial institutions (e.g., banks, insurance companies, credit unions), trading platforms, and any service being provided in relation to the financial interests of a user (e.g., store credit, rewards). These platforms may be configured to receive various elements of authentication information, such as passwords, PINs, biometric information (e.g., fingerprints), etc. In some embodiments, financial services platforms 108 further include computing devices and systems that are adapted to be used by a user in relation to obtaining financial services, such as applications being available on mobile computing devices, etc. These mobile computing devices may be able to receive various elements of information, including passwords, PIN information, biometric information (e.g., photos taken on a camera, voice information taken from a microphone, location information from tracked coordinates, behavioral information such as steps taken or accelerometer data).

Identity-as-a-Service (IDaaS) platforms 110 include, for example, platforms that are designed specifically to track access across a number of platforms, for example, single sign-on systems, authentication and access. These systems may be in electronic communication with directory services (e.g., LDAP or OLAP), which allow for authentication cross-platform in secured environments. An important consideration for such systems is that access needs a high level of identity verification as multiple services and access provisioning may be based off of a single validation.

Internet of Things devices 112 include various devices that are configured for communication with one another or with various back ends. These devices are increasingly widespread, and may include intelligent appliances, home automation solutions, security, etc. As more features become automated, trusted authentication and/or verification may be increasingly important as there may be significant security and privacy concerns that may be raised in relation to information being provided and control being provisioned.

Universal API 114 is configured to allow for multiple different APIs to be used, and to ensure compatibility with different systems. For example, an implementation may have a web services API, a WCF services API, a Database API, and RESTful API with the ability to add more interfaces, as required. These interfaces may be configured for providing adapted information for third party services, adapted based on common functionality and information stored on platform 100. For example, a particular access control system may require information packaged based on a specific protocol that may be different from another access control system. Accordingly, universal API 114 is adapted to be able to access information stored on data structures, including trusted profile information and biometric data sets in response to various computer-implemented instruction sets, and queries.

Universal API 114 is configured to generate output payloads that are developed in response to specific requirements of various external systems. For example, a lookup table or other logical conditions, functions, and triggers may be applied to transform the data set from a generic function to a specific function for use with the system.

Universal API 114 is important for the integration of 3rd party software packages directly into the platform 100, and also provides us the ability to do more than one integration at a time. For example, in global corporations, there may be 3-5 Physical Access Control systems in place, one for the retail stores, one for the corporate offices, one for their warehouses, and one for their data centers.

The platform 100 unifies the biometric data across all the systems so that when an employee goes between their locations, they do not need to re-enroll, they just work. The platform 100 is provisioned to provide a frictionless user experience (e.g., increased convenience and security). The different data types and structures are also handled to provide for cross platform support and increased flexibility in relation to new services being added, new biometric modalities being added, as provided from a diverse range of devices that may be trusted at different levels of trust.

Platform 100 includes Trust AI 116, an identity manager unit 118, a biometric matching unit 120, a data security unit 122, a directory services unit 124, and a template distribution unit 126. The platform 100 further includes a single identity database layer 128, which maintains one or more data structures configured for the storage of one or more biometric data sets.

Trust AI 116 is configured to dynamically reweight and modify how the system interacts with information stored on various biometric data sets over a period of time. In some embodiments, feedback, machine learning, and/or artificial information (AI) techniques are utilized by the Trust AI 116 such that the requirements for establishing a "trusted profile" are adaptive to identified environmental information (e.g., time of day, location of users, month, weather), convenience information (e.g., success rate of authentication by modality, average time of matching/verification), events (e.g., compromised data alerts, compromised network, security incidents).

The "trust level" associated with specific modalities, device types, specific devices, communications pathways, encryption methods, etc. may be dynamically modified in view of specific outcomes that the Trust AI 116 is configured to trend towards. For example, a biometric system may be configured to intelligently balance convenience and security level between acceptable thresholds.

The Trust AI 116 is configured to advantageously utilize determined and/or monitored differences in the obtaining of processing of biometric data sets from different modalities or different sources to balance convenience and security level between acceptable thresholds. For example, if five modalities are available to the Trust AI 116, the Trust AI 116 may be configured to select at least two modalities for determining (e.g., by verification or matching) associated with an unknown user that provides at least high confidence score for a highly secured facility. The Trust AI 116 may be configured for determining the specific combination of modalities and requirements (e.g., 2-5 fingers for fingerprints, password, retinal scan, voice scan), based on trust level associated with each element, a threshold of convenience (computing must be faster than 10 seconds), a threshold of security (high security could mean a score between 60 and 80) and also other extrinsic information, such as position of individual, consequences of malicious access, time of day, behavioral cues, etc.

The identity manager unit 118 may be configured for providing and maintaining trusted identity profiles for one or more users. In some embodiments, identity manager unit 118 is configured for cross-linking of identity profiles and information such that trends, strengths, and/or weaknesses in relation to trust may be propagated across users and profiles. In some embodiments, the identity manager unit 118 may also be configured to identify duplicates.

The biometric matching unit 120, The biometric matching unit 120 is configured for mass scale matching across a variety of template types, and security levels. For example, ISO vs Suprema™ templates, sizes of 384 vs 768 bytes. The biometric matching unit 120 developed by Applicant has been also scale-tested to work with matching 250,000 templates in under a second.

An analytics engine is provided that is configured to store, manage, and report on all events within the platform 100, adapted for the creation of an audit trail, and leveraging the data to predict template usages, and dynamically re-indexing the matching engine based on usage (e.g., successful/unsuccessful authentications, computing time).

A directory services unit 124 is provided that is configured to manage the security of users within the system, and also to handle the variety of credentials, and biometric modalities, the service is also able to integrate into 3rd party directory services such as Active Directory or LDAP.

A template distribution unit 126 is configured for the generation of templates based on stored biometric data set information and the propagation of the templates to different parallel processing units.

The platform 100 further includes a single identity database layer 128, which maintains the one or more data structures configured for the storage of one or more biometric data sets, such that the set of templates associated with an identity of a particular user can be associated with user profile information, and corresponding trust and confidence levels can be associated with each of the templates, for example, based on characteristics of extract, how current the template is, whether the modality has been compromised, etc.

Platform 100 includes a biometric software development kit (SDK) 150, including configured interfaces that are designed for communication with a variety of different biometric devices that are configured to capture one or more biometric modalities. These biometric devices, for example, may include various authenticator systems (e.g., facial 130, voice 132, behavioral 134, eye 136, finger 138, heartbeat, password, PIN capture systems). These biometric devices may include both systems that are designed as single-purpose devices, or general computing devices that are configured to be able to provide functionality beyond biometric recognition, such as smartphones, tablets, etc.

The platform 100 may also connect to devices from various manufacturers and organizations, include Suprema™ devices 140, Digitus™ devices 142, and other third party devices 144. In some embodiments, various third party databases and storage may be in communication with platform 100 such that information may be obtained in relation to extrinsic factors that may not be associated with a particular individual, but may rather be associated with population data in general (e.g., the number of people residing in the Eastern United States), groups of individuals (e.g., customers of a particular social media platform have had their identities compromised), or extrinsic information (e.g., event-related data, time of day, date), among others.

The platform 100 is configured to receive information in the form of data sets from the biometric devices into universal biometric software development kit (SDK) 150 (e.g., a standardized biometric SDK). The data sets may include information including biometric data payloads (e.g., identifying features of biometric data), information relating to the capture, information relating to the completeness of capture, information relating to the device itself, information relating to the communication method in which the data is transmitted, information relating to the security features relating to the data being transmitted, among other information. The data sets, where captured by a device capable of general computing functions, may be adapted to track device type, whether the secured feature is sandboxed, whether secure communication protocols were used, the type of secure communication profile, etc.

The platform 100 is configured as a hardware abstraction layer that provides a degree of separation from the devices and the system on the top end. As devices all use different methods to communicate, from TCP/IP or UDP protocols, synchronous or asynchronous communication, SDKs, or cross-service APIs, and these methods may evolve as different generations of protocols are released.

Universal SDK

Universal SDK 150 and platform 100 are adapted to simplify the adoption of biometric technology for application developers, by normalizing the communication paths to all modalities by creating a single SDK that allows application developers to implement multiple biometric modalities through a single integration. Using the platform 100, application developers are able to access to the leading modalities in a variety of categories (including but not limited to; face, eyes, voice, fingerprint, cardiac, and behavioral biometric modalities).

The platform 100's SDK 150 can be accessed by both application developers who are looking to embed biometric technologies into their mobile applications, as well as by hardware-based biometric device manufacturers who want to include compatibility for use with the platform.

Communication standards are not always identical across each biometric modality, and SDK 150 is configured to ensure that a common level of communication and security standards are met across all biometric modalities.

Standardized user interfaces and user experience flows are provided within the SDKs, permitting application developers to include multiple modality types within their application without worrying that the "look and feel" of each modality being drastically different.

Standardized communication & security requirements are provided. For example, wide area networks such as WiFi points and cellular networks can be intercepted by fraudulent users, and it is important that biometric technologies within the platform meet high standards for transferring data between the device and platform 100. The requirements include but are not limited to using secure public/private key encryption to ensure the safe transfer of data.

SDK function mapping is performed to utilize (where possible) automated systems for mapping SDK function calls. This technology helps expedite the process of updating SDK libraries when a modality releases a new SDK and allows the platform 100 to provide technology to the market faster than other platform vendors.

Universal API

Similar to the market problems surrounding relating to a divergent set of modalities and devices, some application developers may find it more difficult to take advantage of biometric technology when they either don't already have a mobile application to integrate an SDK, or if the use case is not suitable for a mobile deployment of biometrics.

The Universal API 114 is configured to provide a platform from which any application with an identity requirement can utilize one or more biometric technologies.

The API 114 is the gateway into the platform 100 and can be used by both mobile application developers who are implementing biometric functionality, as well as application developers who may not already have a mobile application and want to leverage the platform 100 for biometric authentication.

The Universal API 114 serves the following primary functions: it provides a gateway for authentication requests and responses to/from relying applications; it handles requests for authentication are then passed onto the Trust AI before biometric matching; and it provides a gateway for biometric identification (1:n) requests from either a mobile authenticator or applications that have integrated the SDK 150, and it provides a gateway for uploading and downloading template data to biometric devices, facilitating the secure transfer of biometric data across devices.

Trust AI

Security requirements can be different for all types of applications—The level of identity assurance required by a simple application login is likely very different than the level of identity assurance required to perform a high risk transaction such as a large financial money wire. However, higher security authentication techniques often cause a tradeoff of convenience.

When it comes to biometrics, it can be difficult to know the level of identity assurance that a biometric modality provides. In many cases the market solution involves combining biometrics with other modes of authentication and creating static rules or policies regarding which types are required for various transactions. This comes at a cost to the overall user experience and slows the adoption rate of biometric technology.

The Trust AI 116 is configured to solve these problems by dynamically assessing the risk and identity assurance requirements of transactions using various captured data and matching the authentication requests to the appropriate authentication modes. This technology both helps ensure that the necessary security/identity assurance requirements are met for all authentication requests, while at the same time assessing scenarios where the identity assurance requirements are low and thus lowering the authentication requirements to the user—improving the user experience where possible.

The Trust AI 116 uses a number of "inputs" to determine the level of risk and identity assurance requirements associated with an authentication request. Examples include, but are not limited to authentication patterns for a specific user, time of day authentication patterns, day of week authentication patterns, geographical authentication patterns, device type/identifier authentication patterns, and other extrinsic factors, such as whether there are known vulnerabilities with the type of device requesting authentication, is the request originating from a geographical location known for fraudulent attacks, among others; behavioral biometric factors such as whether behavioral biometric data captured using the SDK 150 during the authentication request, and are there usage patterns within the behavior, walking pace, posture detected through accelerometer, fingerprint touch screen gestures, typing patterns, among others.

In some embodiments, the factors for consideration are voluntary (e.g., user actively provides them), and in some other embodiments, the factors are involuntary (e.g., the modalities are passively tracked and the user is unaware). In yet further embodiments, the factors are a combination of voluntary and involuntary.

Accordingly, using a combination of these data inputs (when available), the Trust AI 116 is configured to intelligently determine the likelihood that the authentication claimant is the correct identity. If the output is that the claimant is likely the requested identity, then the Trust AI can reduce the authentication requirements by allowing the use of less factors for authentication, biometrics that offer more convenient/easy use, or in some cases bypassing further authentication altogether. The Trust AI is configured to reduce the authentication requirements to the minimum set by the relying application. Therefore the relying application would have the ability to set a minimum authentication requirement that the Trust AI could output to the user.

The Trust AI 116 may be configured to raise the authentication requirements beyond the minimum requested by the application if it detects risk when evaluating the various data input factors. This ensures that a balance is kept between strong security/low convenience and low security/highly convenient authentication methods.

Biometric Authentication System—Adaptive Trust AI

Figure 1B:
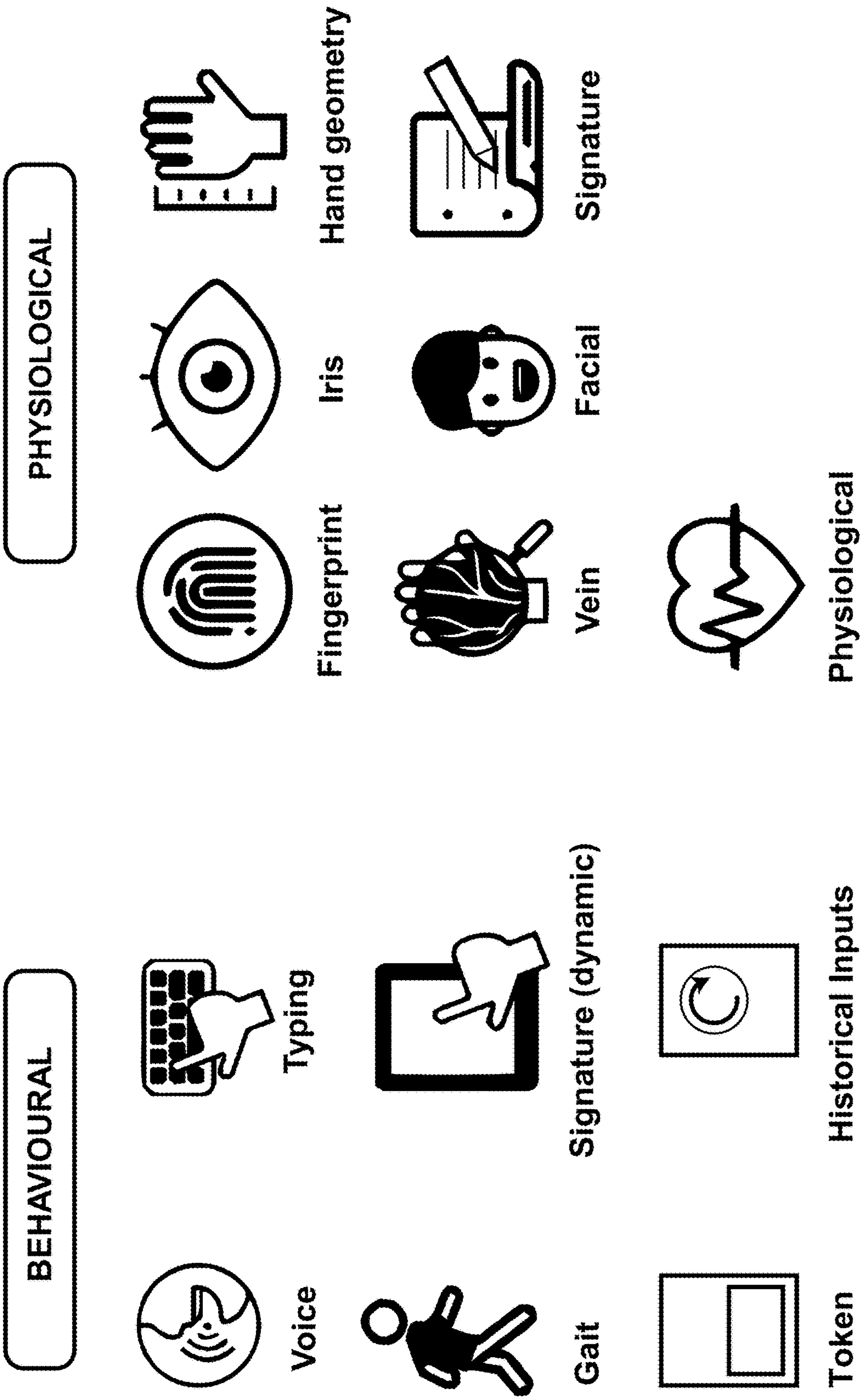
FIG. 1B is an illustration showing various example behavioral and physiological modalities, according to some embodiments.

FIG. 1B is an illustration showing various example behavioral and physiological modalities, according to some embodiments. There may be other behavioral and physiological modalities, and the ones shown are by way of non-limiting examples.

Figure 1C:
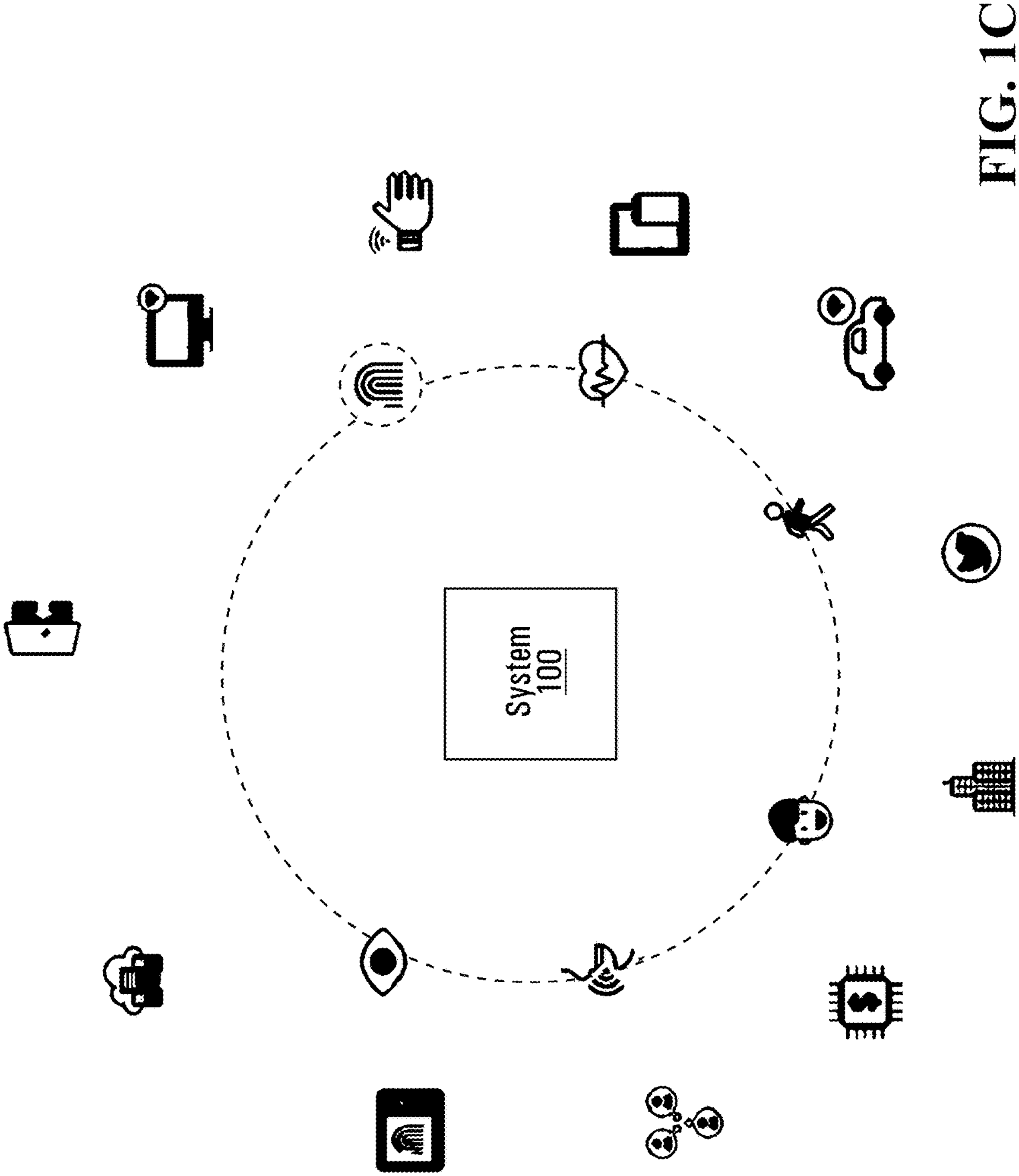
FIG. 1C is an illustration showing the system in operation acting as within an identity ecosystem whereby there are a number of different primary biometric modalities and secondary contextual factors, according to some embodiments.

FIG. 1C is an illustration showing the system in operation acting as within an identity ecosystem whereby there are a number of different primary biometric modalities and secondary contextual factors, according to some embodiments.

Figure 1D:
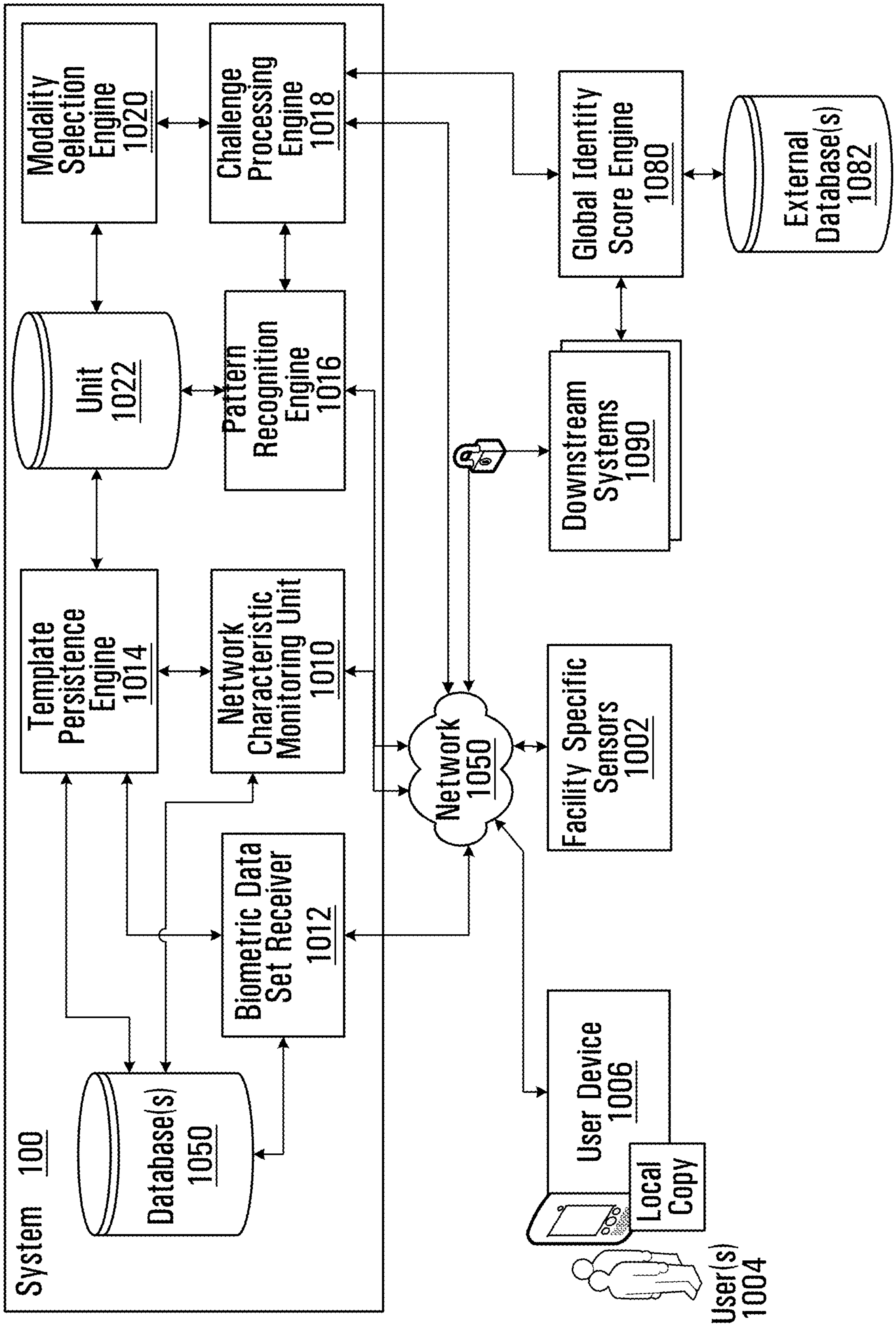
FIG. 1D is an block schematic for a system configured for the processing of a plurality of biometric information data sets, according to some embodiments.

FIG. 1D is an block schematic for a system configured for the processing of a plurality of biometric information data sets, according to some embodiments. The system 100 shown in FIG. 1D includes one or more engines, computing units, and data storage that operate across a network or networks 1050. The engines are implemented using computer resources and processors.

The system 100 is configured for electronic communication with a user device 1006 associated with a user 1004, various facility specific sensors 1002 (e.g., wall-panels, swipe card receivers, computer-network firewalls, computer logins), and is adapted for responding to various authentication challenges such that a control signal or response can be transmitted that effectively either provides a representation that the user is indeed who the user purports to be, or actively provisions access.

Failure/rejection signals are also possible, and in some embodiments, the system 100 is also configured to generate unknown/inconclusive signals, or signals requesting that a user is provisionally allowed but additional logic is utilized (e.g., additional monitoring for estimated suspicious behavior). The system is configured to perform automatic and autonomous adaption of user identification decisions to an user identification challenge request based on one or more extracted patterns of behavior. In some embodiments, system 100 further identifies which modalities (and how they should be tuned) to present to the user to respond to a particular challenge request. For example, if a confidence score requires a minimum of 65 to pass, the system 100 is configured to optimize the selection of a modality such that the modality, upon successful verification, will provide at least 65 while minimizing overall processing time and/or the probability of a false rejection (e.g., the actual user was rejected when trying to authenticate his/herself).

The system 100, for example, may control access various aspects of downstream systems 1090 (e.g., banking server, access to a root directory, opening a door, granting administrator access). In some embodiments, the system 100, in receiving an authorization request from downstream systems 1090, may be provided with an indication of a challenge difficulty level, that may be translated into a confidence requirement threshold. For example, the downstream systems 1090 may send, in an encapsulated authorization request, an indication that a particular request is for a low, medium, or high security situation. In such embodiments, the system 100 may be configured to assign or otherwise determine a required confidence score in view of the indication from the downstream systems 1090.

In some embodiments, the system 100 interoperates with a stored profile on storage unit 122, retrieving records indicating a particular demographic (e.g., elderly, illiterate) or assistive requirements for a user. The system 100 may, for particular demographics who may have increased difficulty with motor functions or operation of mobile devices, reduce a required challenge score level.

System 100 may engage in electronic communication via numerous different mechanisms, such as using one or more network interfaces and/or connections, including wired, wireless, and other connections. Data communications across these network interfaces and/or connections are monitored via network characteristic monitoring unit 1010, which is a router or other type of networking component that tracks characteristics associated with network communications, such as originating IP addresses, packet type, packet encryption technique, a trace-route identified pathway, available bandwidth, etc. For example, network characteristic monitoring unit 1010 may be configured for reading header information from network traffic to parse or estimate various characteristics of networked communication.

Network 1050 includes one or more network connections. In some embodiments, the specific network connections being utilized are factored into determinations of which modalities to present challenges on, and how they are tuned. For example, to avoid correlation between the characteristics of a fingerprint reader and a retinal scanner, the fingerprint verification may be requested to be transmitted over a cellular network to the server to avoid sharing a vulnerability with the retinal scanner, which may be attached to a wired network having a particular SSID.

In some embodiments, the network characteristic monitoring unit 1010 is further configured to identify performance issues relating to the various authentication mechanisms, and record the network characteristics into data storage unit 1022, which can later be used to either identify that a particular biometric modality or verification mechanism is particularly slow or requires a large amount of processing time, etc. In further embodiments, the network characteristic monitoring unit 1010 is configured to identify alternate communication pathways for various sensors 1002 and devices 1006, and/or request additional processing resources where necessary.

Biometric data set receiver 1012 is an interface that is configured for receiving data sets related to biometric modalities (e.g., from facility specific sensors 1002). The biometric data set receiver 1012 may include an API or SDK to obtain data sets from the sensors 1002, and additional information sets may also be received in the form of data records indicating specifications (either hard-coded or tracked from historical information) from each of the facility specific sensors 1002. This information may include, for example, actual/estimated false acceptance rate, a false rejection rates, different tuning options (e.g., number of feature points to collect, a desired depth of analysis), estimated processing times, bandwidth, whether local/server side matching is required (or a combination), whether the facility specific sensors 1002 are configured for 1:1 verification or 1:n matching, among others. Where 1:n matching is provided, the value of n may be tunable to modify the false acceptance rate. In some cases, a matrix of processing time, false acceptance rate and a false rejection rates is provided in a data container.

The biometric data set receiver 1012 may also receive enrollment data in the form of raw or processed biometric information, or in some cases, templates that can be used for later matching. The biometric data set receiver 1012 is configured to track characteristics of one or more provided enrollment feature templates, such as age of user at the time of enrollment, an enrollment quality (e.g., how many features were successfully identified), a time-stamp of when the last enrollment occurred, etc. The biometric data set receiver 1012 is also configured to receive biometric data sets at the time of challenge, such that the received biometric data sets are utilized for comparison against stored templates for testing whether a biometric challenge was successful or not.

The template persistence engine 1014 is configured to maintain, for each user, a user profile. Each user profile is associated with an enhanced reference template data structure, or has a record on a combined enhanced reference template data structure, the enhanced reference template data structure include various data types and objects that in aggregate amount to the system's view of a user's identity, summarized as an overall identity score. More granularly, the user profile is configured to be matched against contemporaneous data sets to process one or more challenges pertaining to the identity of the user.

Pattern recognition engine 1016 is configured to track contextual identity data, and in some embodiments, the pattern recognition engine 1016 is configured to detect patterns in either time-coded data or event-driven discrete data obtained from facility sensors 1002, user devices 1006, among others. The pattern recognition engine 1016 is configured to track time-series encoded information, such as gyroscope readings from user device 1006, contemporaneously, generating a rolling or moving average using the latest readings. In some embodiments, the pattern recognition engine 1016 includes memory or a cache such that recently recorded or accessed information is available for persistence for a longer time such that trends or other patterns can be drawn from it. For example, in the context of access provisioning and security, it may be beneficial to have information that persists over the course of a year such that seasonality effects can be determined. For example, cold air humidity may impact the ability to read fingerprints, among others. The pattern recognition engine 1016 is configured to track (i) general information associated only with a particular user, (ii) patterns of which factors turned out to be related to malicious behavior, (iii) a strength of a correlation between statistical analyses of various components.

Pattern recognition engine 1014 is configured to enhance the stored data structure with additional contextual information, the additional contextual information being stored for later usage in modifying or adapting weighting of contributions of confidence scores associated with successful biometric validations, or, in some cases, future determinations of which biometric modalities to present in the form of challenges to the user (e.g., using patterns for ranking the biometric modalities to determine an ordered combination or set of biometric modalities that if successfully verified, will meet the minimum confidence score requirement in aggregate).

The pattern recognition engine 1014 is configured, in some embodiments, to continuously conduct a latent continuous authentication/verification by running a daemon or lightweight monitoring program on the mobile application (with the user's consent), the daemon or lightweight monitoring program continuously tracking received passive validation data sets to continuously vary a latent identity score that is used as a proxy for confidence. If anomalies are detected for example, in gait (as received from gyroscopic or accelerometer movements), a reduction in the latent confidence score may occur.

Pattern recognition engine 1014 is configured to generate identified usage patterns representative of the one or more extracted patterns of behavior based on the tracked contextual identity data to generate one or more identity attributes associated with each tracked contextual identity data type, the one or more identity attributes representative of a correlation with tracked user profile information stored on the enhanced reference template data structure.

The challenge processing engine 1018 is configured for receiving challenge requests and parsing the challenge requests to identify the required confidence level for a particular application or use. The required confidence level can vary, and in some embodiments, a biometric challenge may not be necessary at all. For example, in an embodiment, a required confidence level is 0, and as long as the pattern recognition engine 1014 has not updated the data record on the enhanced identity profile with anomalies in the latent continuous authentication/verification, a user is simply able to log in without further inputs. However, in detecting an anomaly in gait (e.g., a pickpocket has stolen the mobile phone), the latent confidence level falls to −5, and a biometric challenge is requisitioned before access can be granted. This may be applicable, for example for low-security requiring applications, or usage within a secured facility where all users are already authenticated (e.g., within a workplace).

The challenge processing engine 1018, upon each successful verification against the biometric template data maintained on the enhanced reference template data structure, modifies a baseline confidence contribution score from each successful verification in accordance with the one or more identity attributes to generate an overall, adapted confidence score aggregated from each baseline confidence contribution score. For example, the challenge processing engine 1018 may request that a fingerprint (50 points), a retinal scan (100 points), and a password be required for access (25 points), to meet a required confidence score of 135. The contributions from each of the fingerprint, the retinal scan, and the password are first weighted (e.g., adapted) based on additional information stored on the enhanced identity template (e.g., contextual factors, such as device ID, screen resolution, recent gait readings). Despite having successful verifications across all modalities, the weightings may yet still fail to meet the requirement (e.g., $50\times0.5$ for fingerprint+$100\times0.5$ for retinal scan, +$25\times0.8$ for the fingerprint reading).

In some embodiments, a modality selection engine 1020 is provided that is configured to maintain a data structure storing a ranking of various modalities and their overall contribution to a confidence score, adapted for contextual factors. The data structure, in some cases, is expanded with variations of modalities having variations of factors which can be fine-tuned or modified in usage that would lead to different confidence scores (e.g., fingerprint reading against local vs. server copy, fingerprint reading with five hundred points, fingerprint reading with three thousand points, fingerprint reading sent via network with SSID "bioconnect", fingerprint reading sent via cellular network, fingerprint reading sent via NFC, fingerprint reading from smartphone, fingerprint reading from wall reader, 1:n fingerprint reading, 1:1 fingerprint reading, variations of the value of n).

The data structure may also track rolling average processing times required for conducting each modality and/or each variation of each modality. In some embodiments, false rejection rates are also tracked and factored into assessments of processing times, as a false rejection may be considered simply an additional processing step (e.g., fingerprint rejected 1% of time, user may simply just press the finger again, but there may be an impact on a holistic interpretation of processing time). Rankings may be generated for the modalities and/or their variations, and the rankings of the variations may be stored by way of a sorted list. Additional variations are generated and stored for each modality, and each modality is represented by a series of records storing combinations thereof of factor that can be modified or controlled by the system 100.

Where an authorization request is encountered with a specific challenge requirement score, the modality selection engine 1020 accesses the data storage 1022 and generates one or more combinations of modalities, which if successful, should yield a successful overcoming of the challenge requirement threshold. In some embodiments, the combinations are selected that achieve the threshold while requiring as minimal as possible processing time. In some embodiments, the processing time may be adjusted by a reduced weighting where there is correlation between the characteristics underlying the modalities. For example, to meet a requirement threshold of 85, a potential approach may be to provide a fingerprint (80 points), and a voice scan (50 points nominally, but reduced to 5 points due to the voice scan occurring on the same device as the fingerprint, and on the same network). Nonetheless, to meet the challenge, the system 100 presents the fingerprint and the voice scan on the same device as the variation is able to meet the threshold while providing the lowest processing time required of all available options. Where a user is unable to or unwilling to utilize a particular modality, a second best or third best combination can be presented.

The challenge processing engine may, responsive to the adapted confidence score exceeding a required confidence score threshold, generate a response signal representing that the user's identity has been successfully verified, the information being passed onto downstream systems 1090.

In some embodiments, a global identity score engine 1080 is configured to track an overall identity score for a user, that persists beyond a single organization or application. A data structure, stores, for usage across many otherwise disparate systems and organizations, an "identity score". The "identity score" on the profile stored on the global identity verification mechanism can thus be utilized as a type of cross-platform evaluator metric that is helpful in informing an estimation of the "real identity" of a user.

The global identity score engine 1080 is, in some embodiments, configured to track population level trends and patterns, and in some embodiments, downstream systems 1090, user devices 1006, and/or facility specific sensors 1002 are configured to periodically transmit data containers to global identity score engine 1080 representative of trends and patterns that may be indicative, for example, of newly identified vulnerabilities or surprising combinations of modalities and characteristics that lead to a reduced incidence of breaches.

The identity score may be utilized to indicate that, for example, on another system or on a shared identity management system, that a particular user has a strong set of validated credentials, which are then utilized in determining a particular identity score. The identity score can be indicative of, for example, how fulsome a particular user's profile is, patterns of successful authentications, and patterns of consistent behavior. Conversely, patterns of failed authentications, and inconsistent behavior can lead to a reduced global identity score. In some embodiments, the global identity score is utilized as an overall weighting factor in modifying a contribution of a successful biometric verification against a challenge threshold.

For example, the global identity score engine 1080 may transmit, in response to a function call, a score of 800 to the downstream systems 1090. While a fingerprint verification only led to 50 points, the fingerprint may be adjusted up to 100 points, and challenge requirements that otherwise needed more than a fingerprint verification are now satisfied given the user's history. In some embodiments, the global identity score can be adduced by the user providing a hash-based token representative of the user's identity and a linkage to the user's global identity, among other verifications. The token is utilized to allow cross-platform credentials to be accessed in a secure way. The token may be appended to the enhanced template, or generated on an as-needed basis.

A user using the system may be able to, over time, accumulate a strong global identity score similar to how a credit score is accumulated. In some embodiments, the user device 1006 includes an application or monitoring tool that continuously conducts latent verification or identification, and the global identity score engine 1080 periodically retrieves data from user device 1006 to maintain an on-going confidence score associated with the user across a period of time.

Figure 2:
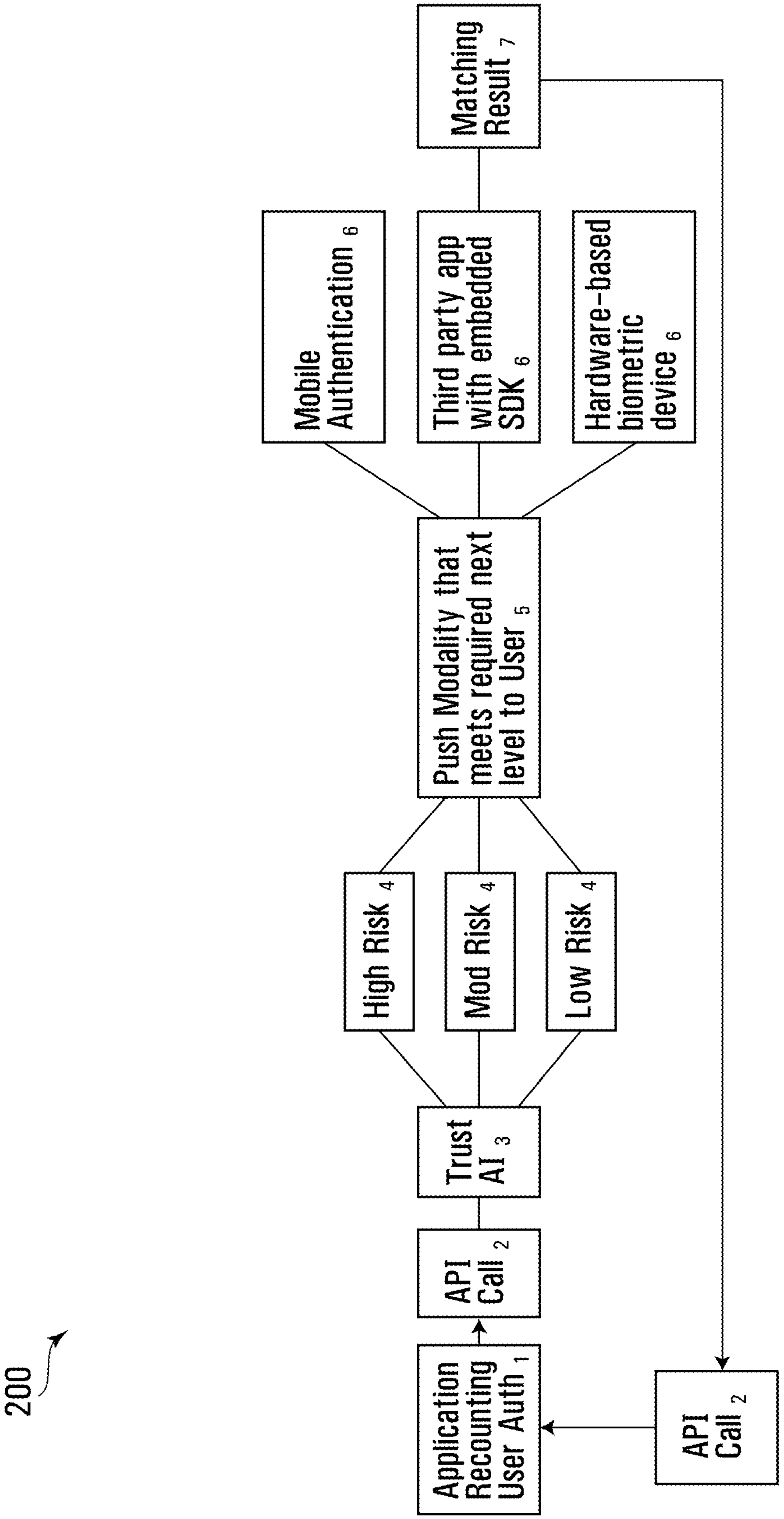
FIG. 2 is illustrative of an example workflow for a request for authentication, according to some embodiments.

FIG. 2 is illustrative of an example workflow 200 for a request for authentication, according to some embodiments. The workflow may be performed, for example, by the platform 100 where a request for authentication is received, for example, through the SDK 150. The authentication process includes utilizing the Trust AI 116 to classify and determine the modality needs required for a particular risk level. The API 114 may interoperate with various biometric devices and other extrinsic devices to obtain biometric data sets that are utilized for authentication (e.g., by verification or matching), and the matching unit 120 is configured to perform verification on a 1:1 basis (e.g., where the target identity to be confirmed against is known), or on a 1:n basis (e.g., where the target identity to be confirmed against is unknown).

Figure 3:
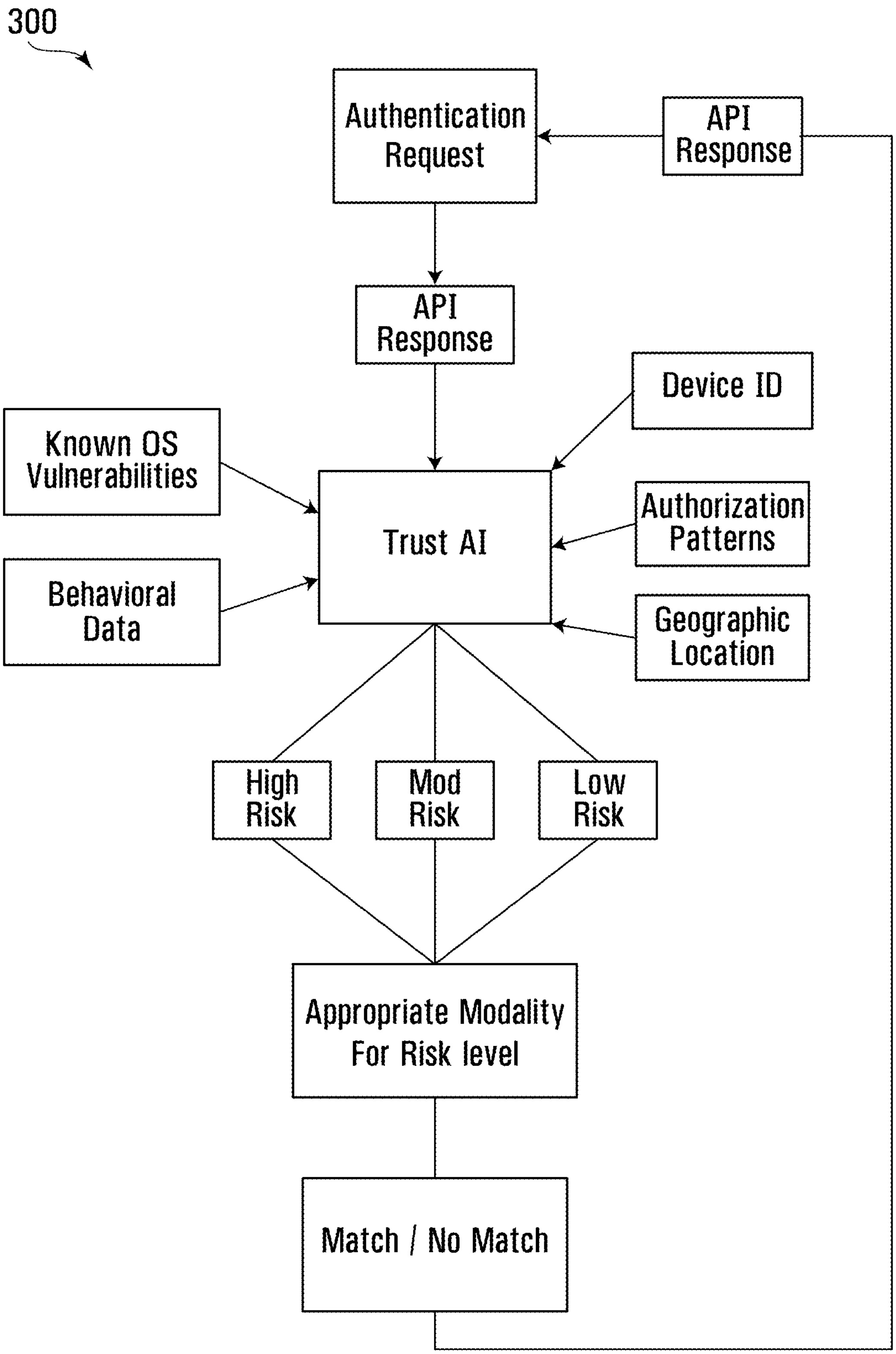
FIG. 3 is an illustration of a workflow illustrating a process for dynamic modification of security threshold, according to some embodiments.

FIG. 3 is an illustration of a workflow 300 illustrating a process for dynamic modification of security threshold, according to some embodiments. Using (but not limited to) the data inputs outlined in the above section, the Trust AI 116 uses artificial intelligence technologies to dynamically determine the authentication requirements for a given transaction. As illustrated in FIG. 3, an authentication request is received which triggers an API call through the API 114. The Trust AI 116 is invoked, wherein authentication information is received from both voluntary and involuntary sources, in addition to extrinsic sources. In some embodiments, the Trust AI 116 maintains an internal reference model comprising a data matrix linking various trust levels, biometric modalities, levels of trust, user profiles, computing time, etc. such that analysis may be conducted against known data sets and linkages can be assigned weightings and scores appropriately based on past behaviors and events.

As indicated in FIG. 3, there may be classifications between various risk levels (shown as high, medium, and low), and the distinction between each of the thresholds may be modified over time in view of feedback received by the Trust AI 116 as it rebalances convenience, available processing power, consequences of unauthorized access, among other factors.

The security threshold, for example, may be utilized to establish different tiers of trust—e.g., if a user authenticates at the data server rack room, the cabinet opens up too since it is at a lower level of trust.

Similarly, the security threshold as it relates to virtual access may vary depending on the type of action being taken by a user. For example, a user may be using a VPN/remote working, and a very high level of trust may be required to be able to delete 40,000 files. In such a scenario, the platform 100 may further dynamically request different biometric modalities as modalities become untrusted or compromised.

Figure 4:
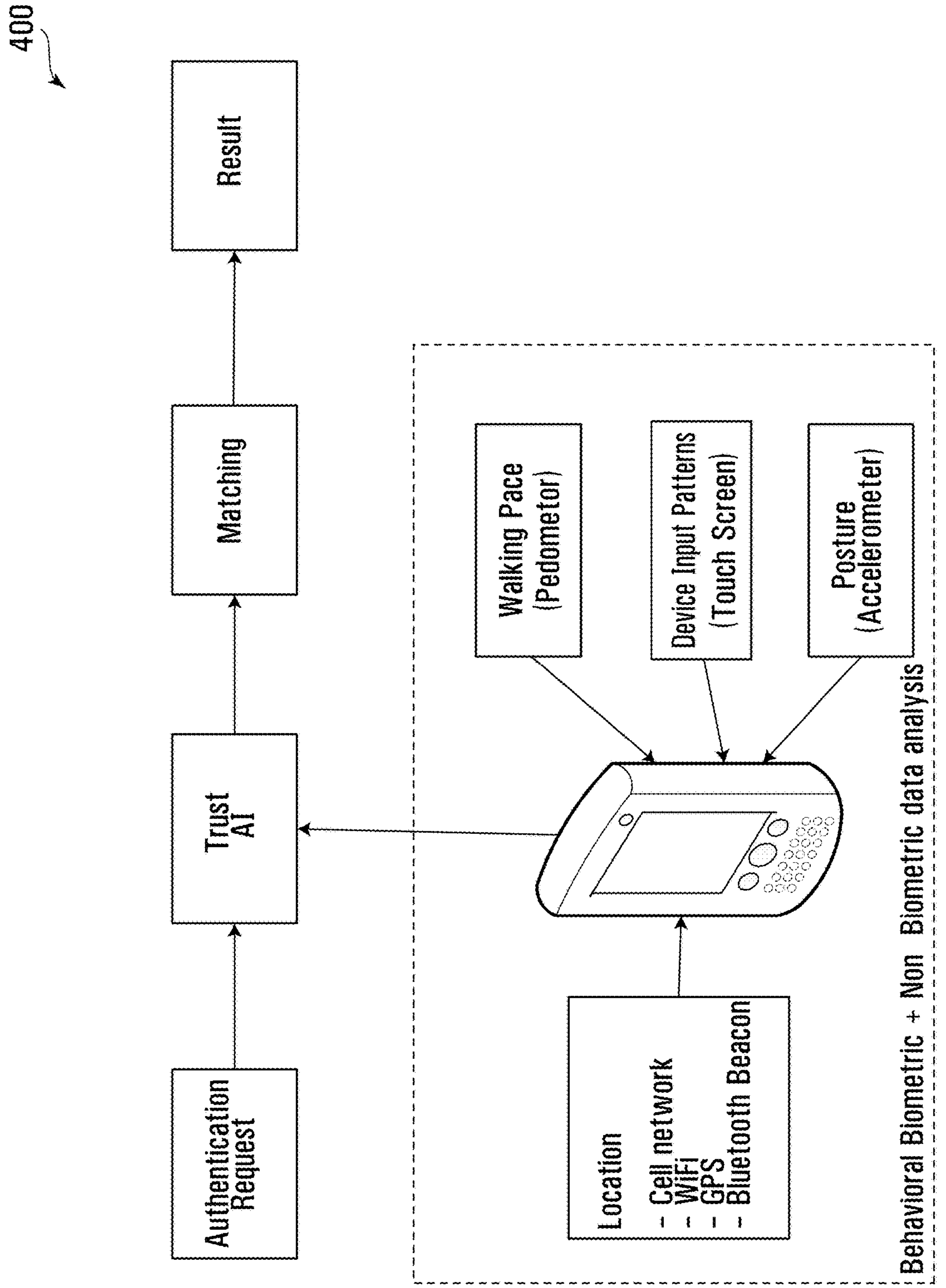
FIG. 4 is an illustration of a workflow illustrating a process for dynamic modification of a modality confidence level, according to some embodiments.

FIG. 4 is an illustration of a workflow 400 illustrating a process for dynamic modification of a modality confidence level, according to some embodiments.

As the platform 100 is adapted for usage with many different authentication types or modes, extrinsic factors can impact the confidence level that the platform 100 has in a specific biometric modality. If a technology included in the platform 100 has been spoofed or hacked, this may lower the confidence level that assigns to the modality (e.g., through suitably configuring an associated score or value).

In some embodiments, the underlying data structure linking biometric information sets and information relating to their sources is adapted for deeper analysis and linkages relating to propagating decreases or increased in confidence score as relationships are identified. For example, it may be determined that all data sets obtained using a particular encryption protocol start becoming suspect as a pattern is determined (e.g., the encryption is no longer good) and the decrease in confidence level is then propagated to all modalities obtained using the particular protocol.

Conversely, if a determined trend indicates a particularly effective protocol, the trust level may increase in view of a sustained pattern of a lack of successful attacks or malicious behavior. Accordingly, if a modality receives improvements and tests result in increased reliability, the confidence level associated with a modality can be increased. For example—identified trends in the data obtained by platform 100 (or through extrinsic sources) may suggest that highly encrypted wired communications are incredibly difficult to intercept and spoof.

Further, the confidence score may include re-weightings based on automatically balancing security and convenience, rebuilding a trusted identity after being compromised, and the use of modalities that a user isn't actively aware of.

In some embodiments, an identity profile may be flagged as compromised, and the platform 100 may be configured to automatically provide a process for "re-trusting" a compromised identity as new information is introduced into the system gradually. Outdated or potentially compromised information may retain some value in identification, although the weighting provided from the perspective of a confidence score may be reduced.

As adoption of biometric identification systems is highly dependent on convenience, such improvements aid in the system being able to automatically reintroduce users whose profiles and/or information has been flagged as suspect.

Similarly, such approaches may also aid in the gradual adoption of strong trust verification practices. Trust AI 116 maintains a constant level of trust and automatically modifies confidence based on determined real-world events (e.g., security breaches) and user convenience, the platform 100 automatically and gradually modifies behavior based on shifting requirements. Accordingly, platform 100, through its design, may automatically provide an "up-voting"/"down-voting" type function over a large enough period of time, data sets, and external data sets.

In some embodiments, platform 100 is a cloud-based implementation and is able to receive reference information at a population level. In such embodiments, Trust AI 116 is configured not only to utilize local data sets for determining weightings and events, but also population-level data sets. Machine learning and artificial intelligence techniques may be utilized to determine the propagation and effects of information breaches over both physical and virtual geographies.

In dynamically modifying challenge requirements and a corresponding required confidence score, various factors are taken into consideration for examining the contribution provided by each successful verification against the biometric template data. Each successful verification is weighted against contextual factors that are present, including, for example, the user's overall "identity score" profile, a sessional score, tracked usage behaviors, deviations from expected values for a similar demographic, among others.

The contribution is also reduced in weight having regard to the actual security level of the biometric modality, and in some embodiments, the security level is initially modelled based on the false acceptance rate. The false acceptance rate may be representative of a likelihood that an incorrect entry is accepted as a correct entry, and represents an indication of potential accidental or fraudulent authorization of unauthorized users. All modalities are susceptible to false acceptances, and this metric can be utilized to assess the contribution to meeting the overall challenge score requirement. Differing characteristics of the biometric challenge may also contribute to the false acceptance rate, such as number of features compared, whether 1:1 verification or 1:n matching is utilized, etc., and in some embodiments, the platform 100 is configured to tune the characteristics of the biometric device such that a desired contribution score (assuming a successful validation) can be achieved.

A false rejection rate associated with the biometric modality may also be tracked, and the false rejection rate may be indicative of a potential loss in convenience that may ultimately be considered in determining overall time required for processing (e.g., as false rejections require the user to expend time in providing information again). False acceptance and false rejection rates, for example, can vary from 1/10000, 1/20000/, 1/50000, among others, and depending on the modality, different false acceptance and false rejection rates yield different failure rates as stringency to reduce false acceptances may impact false rejections, and vice versa.

1:n Identification Matching Techniques—Biometric Batch Processing

There are two types of biometric matching—Verification (1:1) and Identification (1:n). Verification (1:1) means that the identity of the user is being suggested to the matching system before a match takes place. This means, that the user is telling the system who they are using but not limited to a username, account number, card, Device ID.

The benefit is that less computing power is required and it reduces the likelihood of a false accept. This type of authentication is commonly used locally on devices such as smartphones.

Identification (1:n) involves matching a sample biometric data captured from the user at the time of authentication against the dataset previously stored inside a database. The benefits of this type of matching is that there is no requirement for the user to suggest who they are prior to matching. Identification is useful for applications where the identity is not known, or cases where application developers want to streamline the authentication process by reducing unnecessary user input steps.

The difficulty faced with identification (1:n) in the market is when working with large scale databases of biometric data. For a 1:n match to be more valuable than a 1:1 match, it must be able to accurately identify the user in a reasonable amount of time. This becomes increasingly difficult to achieve as databases increase in size, which in many cases prevents large scale adoption of 1:n matching today.

The matching unit 120 is configured for 1:n identification and is adapted to engage processing problems by batching the larger database into smaller datasets. Using small datasets that are a fraction of the larger set, multiple computational processes can take place at the same time.

Within those datasets, the matching unit 120 further prioritizes the order that the sequential matching takes place. The order is prioritized by the likelihood of identity as decided by data collected and calculated using the Trust AI 116 (as described in the section above).

Figure 5:
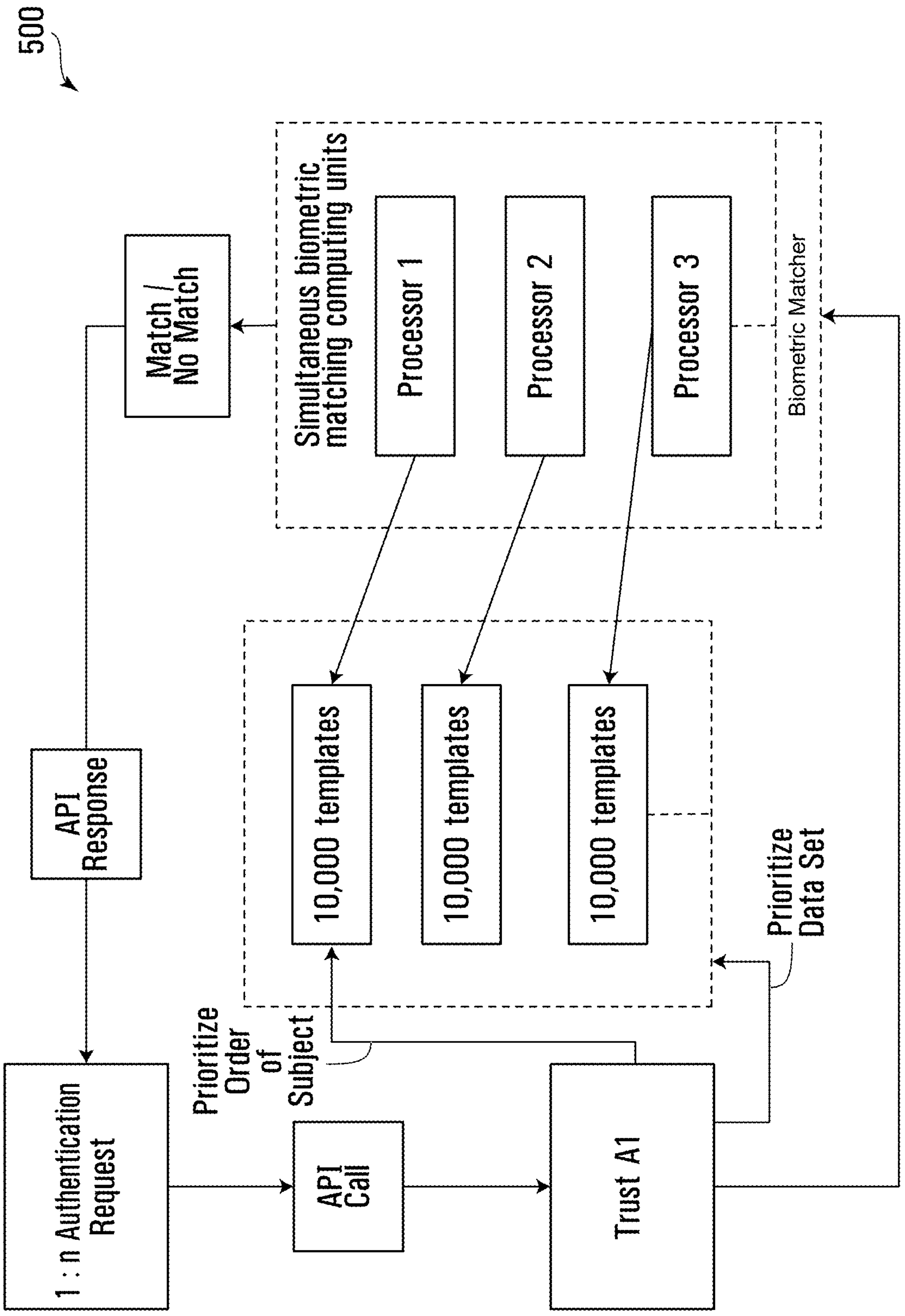
FIG. 5 is an illustration of a workflow illustrating a process for prioritizing datasets based on likelihood of a match to achieve faster 1:n identification speeds, according to some embodiments.

FIG. 5 is an illustration of a workflow 500 illustrating a process for prioritizing datasets based on likelihood of a match to achieve faster 1:n identification speeds, according to some embodiments.

Using the same datasets that the Trust AI 116 uses to determine the risk level and identity assurance required for an authentication, the Trust AI 116 also provides inside into the likelihood of a user match. Using this data, the matching unit 120 prioritizes the small datasets so that the most likely matches appear at the top of the list, resulting in a quicker/more efficient match when sequential matching is used within a data subset.

As depicted in FIG. 5, the Trust AI 116 is configured to split the number of potential match templates into segments (e.g., of 10,000), and these templates are prioritized in various orders within themselves based on factors that militate towards a higher probability of finding a match. Similarly, in some embodiments, the segments themselves may also be prioritized.

The prioritization, for example, may be based on computing power and total dataset size to achieve a faster 1:n identification speed, and segmentation may be determined such that parallel processing benefits are most readily obtained.

The Trust AI 116 can influence which modality type is used based on the computational power required per matching event.

If more than one modality option can meet the risk and identity assurance requirements of the authentication request, the modality that results in the least amount of computational power to perform a 1:n identification will be used.

The Trust AI 116 is configured to influence which modality type is preferred based on the total dataset size required to match against if more than one available modality meet the minimum risk and identity assurance requirements.

In some embodiments, where no match is found after a certain amount of computation, the Trust AI 116 is configured to stop (i.e., "short circuit") the processing and simply ask for another piece of identification that may help with the ability to search. The piece of identification is dynamically selected based on a modality that is most likely to be relevant to the identified subgroup and therefore more likely to lead to a faster determination of a match.

The number of match comparisons may be a dynamically determined number based on convenience factors, in some embodiments, or a predetermined number that may be defined based on a probabilistic analysis of past biometric identity success rates for each modality from each source. For example, the platform 100 may be configured to only process the first 5% of a sorted segment before simply requesting more information to be made available.

Figure 6:
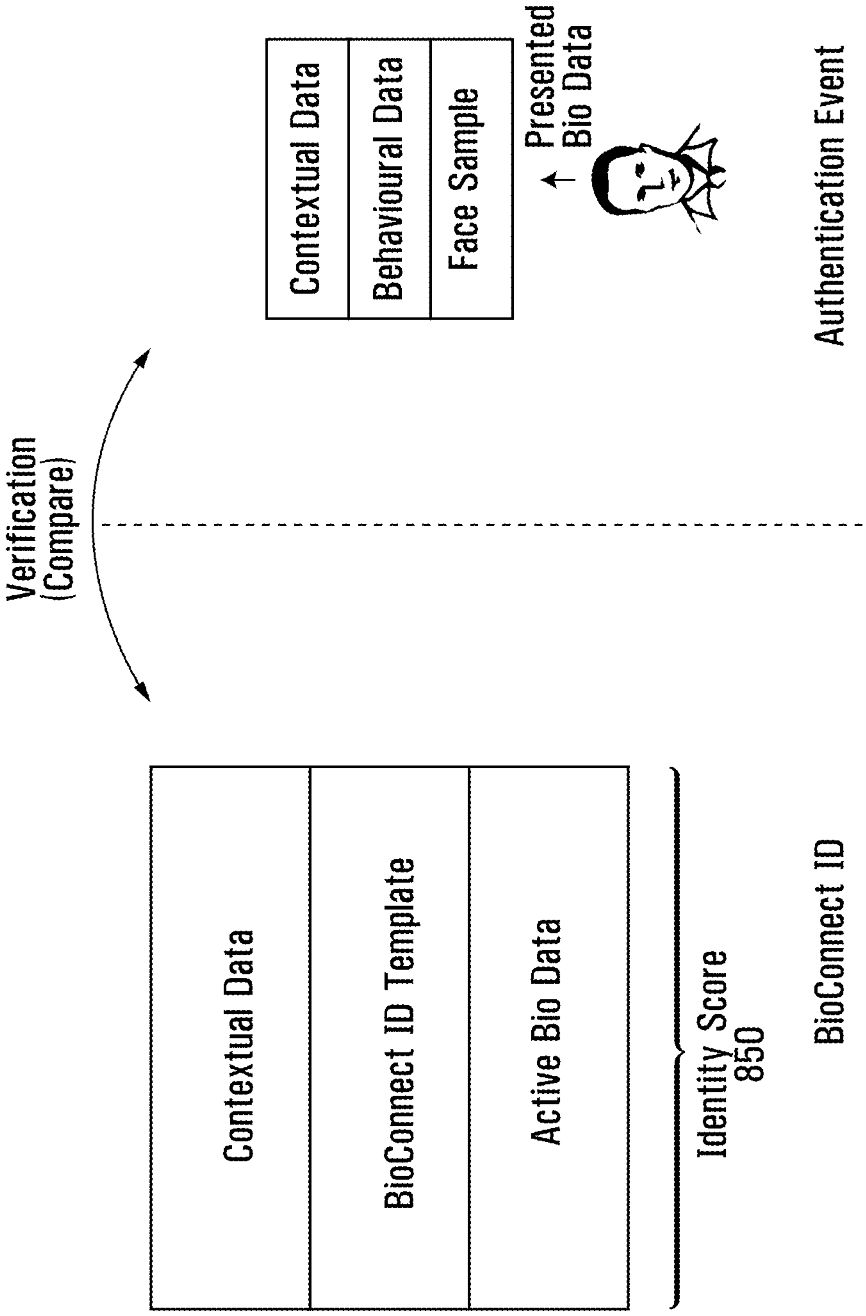
FIG. 6 is a diagram illustrative of interaction between templates and data in the context of an authentication event, where a template and received information are utilized to establish a confidence score, according to some embodiments.

FIG. 6 is a diagram illustrative of interaction between templates and data in the context of an authentication event, where a template and received information are utilized to establish a confidence score, according to some embodiments.

A template data structure is provided that, for every person enrolled within the system, a corresponding data record, holding an identity template is provided. To combat against fragmentation of identity, only one identity template is created per person.

The template begins relatively sparse, populated with basic data including:

Active Biometric Enrollment Data (Example: Face Data, Voice Data, Eye Data, Finger Data, and more)

Initial Behavioral Data (Typing Patterns, Touch Screen Patterns, Accelerometer Patterns, etc.)

Initial Contextual Data (Including Device Identifiers, OS Version, Geolocation, etc.)

The identity template operates much differently than a traditional "template" as known by the biometric industry. Traditionally, template data is simply a mathematical representation of a single biometric dataset, and is the only data the biometric software uses to compare against during a verification. Within the improved identity template, a template refers to wide range of identity data, including traditional templates. All data is intelligently weighted by the strength of correlation with a user's identity, and works together to accurately perform authentication. Higher levels of accuracy than a single biometric template verification alone are thus achievable.

FIG. 7 is an example data structure diagram of information stored in relation to a particular user, according to some embodiments. As shown in FIG. 7, there may be contextual data, passive behavioral data, active biometrics layers, among others.

As a user interacts with the identity template by performing authentication events using applications that are protected by the system, the identity template continues to grow as it becomes enhanced with additional usage data. Over time, enough behavioral biometric and contextual data is collected to effectively assist with passive authentication.

For example, when a user first starts with the identity template, the data record stores only initial information. At the beginning, the template consists solely of active biometric data, and some minimal contextual data. As the user continues to use the system, additional data can be captured which ultimately strengthens the template and identity. With more information, the system's ability to accurately and reliably determine the user's identity increases. The value of the template data is described as an identity score. Much like a credit score, this identity score requires history and positive interactions to increase. Example determinations of the identity score are described in various embodiments.

Once enough data is captured to effectively evaluate pattern correlations, the trust AI engine is configured begins assigning influence weights to each identity attribute. The higher the influence weight assigned to an attribute, the stronger the correlation it has with a user's identity. The attribute, represented by the linked correlation, is processed by the system in weighting verification results, and for example, the weighting may cause the attribute to have a stronger influence on the overall verification result (confidence score) when a comparison is being done between verification data and the data stored within the identity template.

Figure 8:
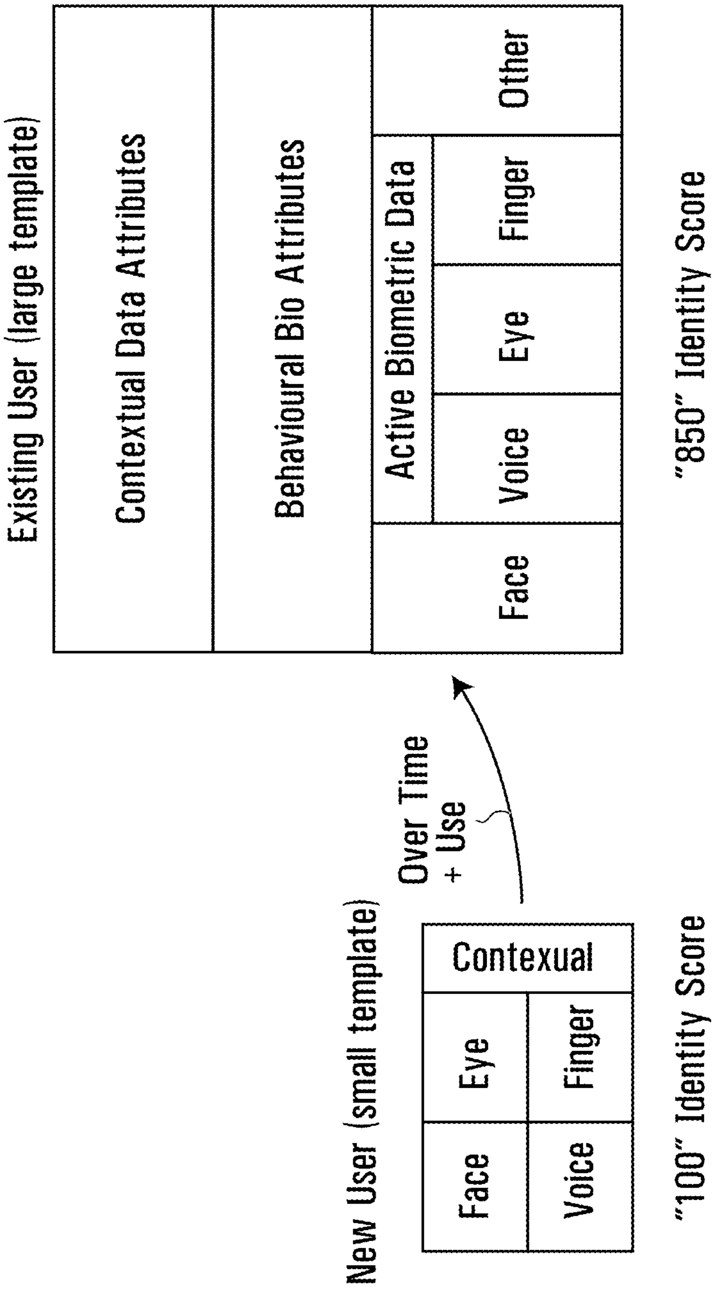
FIG. 8 is an example data structure diagram of the evolution of an "identity score", according to some embodiments.

FIG. 8 is an example data structure diagram of the evolution of an "identity score", according to some embodiments. Different scores are possible, and in a non-limiting example, scores may yield the following:

0 No Data 1-200 Single/Multiple Active Biometric Data Captured.

201-400 Active Biometric Data+Some Passive Data (Behavioral Biometric and Contextual)

401-600 Active Biometric Data+Good Passive Data (Behavioral Biometric and Contextual)

601-800 Active Biometric Data+Strong Passive Data (Behavioral Biometric and Contextual)

800+ Strong Active Biometric Data+Excellent Correlations within Passive Data (Behavioral Biometric and Contextual)

Active biometrics may include biometric technologies that requires a user to interact with it for the purposes of authentication. Face, eye, voice, and finger can all fall into this category. The benefit to active biometrics is that they are very accurate, however the downside is that they can be intrusive. The first dataset to be added to an identity template is active biometric data. This involves a user performing an enrollment of various biometric modalities. During the enrollment phase, traditional biometric template data is extracted from the raw data, and stored within the larger identity template file for the user. Active biometrics carry significant weight within the identity template given their accuracy, consistency, and reliability.

Active biometric template data continues to be updated through use, increasing the accuracy of the unique data points associated with the face, finger, eye, or voice (or other modalities). In addition to fine-tuning the captured biometric data, analysis is also performed on the matching results over time. Biometric template data may be weighted based on age, and in some embodiments, a reduced weighting is provided where the template data has aged, or there has been significant time elapsed since the last use of the enrollment. In some embodiments, age-based deterioration metrics are maintained and utilized to reduce the weighting of enrollments. For example, a user's face may significantly change from ages 5-10, and while there may be a successful verification using a facial recognition sensor, the adjusted contribution to the score may be reduced to reflect that the enrollment may no longer be representative of the user.

Many users will have consistency with their biometric match performance, and this can be influenced by unique biometric traits, matching techniques, and even the environment that user is matching in. Every time a match occurs, a match score is generated. If a user typically matches between 90-100% on average, a match score of 82% while still being accepted by the algorithm will yield a lower influence weight on the overall confidence score generated for the verification. This indicates additional risk, and could require the user to seek additional authentication methods to meet the level of confidence required for the application.

Traditional biometric systems ignore these variances in matching scores, instead simply focusing on whether the match passes a static threshold set by the manufacturer. Analyzing patterns in these variances can significantly increase the accuracy of the biometric system, especially when combined with other identity factors.

Passive biometrics are a focus for an identity management system given their ability to track a user's identity without their direct interaction. This not only improves the accuracy of authentication events, but also with enough data it can streamline authentication—removing some of the manual, obtrusive steps within an authentication process. The goal of passive authentication is to collect enough data about a user to accurately assess their identity without the need for the user to perform any active authentication.

The identity management system uses a number of data sources to capture behavioral biometric data—including, but not limited to:

Keystroke Analysis: The rhythms of a user's typing patterns are captured and stored for comparison during future authentication sessions. Typing speeds, techniques (Caps lock vs Shift Key), Mistakes, and other factors can be logged for pattern analysis and future comparison.

Touch Screen Interaction Patterns: where a user places their fingers on a touch screen as they interact with the interface can be tracked and used for comparison during authentication events. In a mobile UI, people have tendencies to interact with on-screen objects in consistent ways that are different from other users. Where a user tends to place a finger on the screen as the screen is scrolled scroll, or if the user has a tendency to click buttons on one side or the other can be useful data for tracking identity. This may not be a distinguishing factor for all users, and only some users will follow consistent predictable patterns. Touch screen interaction is tracked, for example, by assessing deviations and generating correlation information of prior interactions. For example, greater weight may be placed on the correlation if prior interactions show a particular tendency. Where there is no record of tendencies for clustering, lesser weight may be placed on the correlation.

Touch Screen Pressure: Some devices, including the iPhone™, include pressure sensitive displays, allowing the identity management system to track the finger pressure of the user as they interact with a mobile application.

Mouse Movement Patterns: The way in which a user moves a mouse or other pointer device when interacting with a computer GUI can be tracked, and unique patters/attributes can be extracted.

Accelerometer and Gyroscope Patterns: Accelerometer and Gyroscope data can give very good insights into who is holding a mobile device. This data can be used to determine if a user is using the device in their right hand or left, while walking, if they have hand tremors, etc. By capturing this data and performing analysis on it, the identity management system can use this as a strong indicator of identity.

Page Navigation Patterns: The way a user navigates around a GUI is unique—And like most people, if a user tends to navigate in a consistent manner, this data can be used to indicate identity. Often there are a number of navigational paths a user can take to achieve the same result—tracking the way a user navigate can provide useful data for comparison, and will increase the identity management system's confidence of a user's identity.

Health Data: While health data may not be as strong of an identity indicator as other factors, they can still be an indicator of identity when enough data is analyzed. Examples include:—steps taken per day (and at what time of day)—resting heart rate among others.

Figure 9:
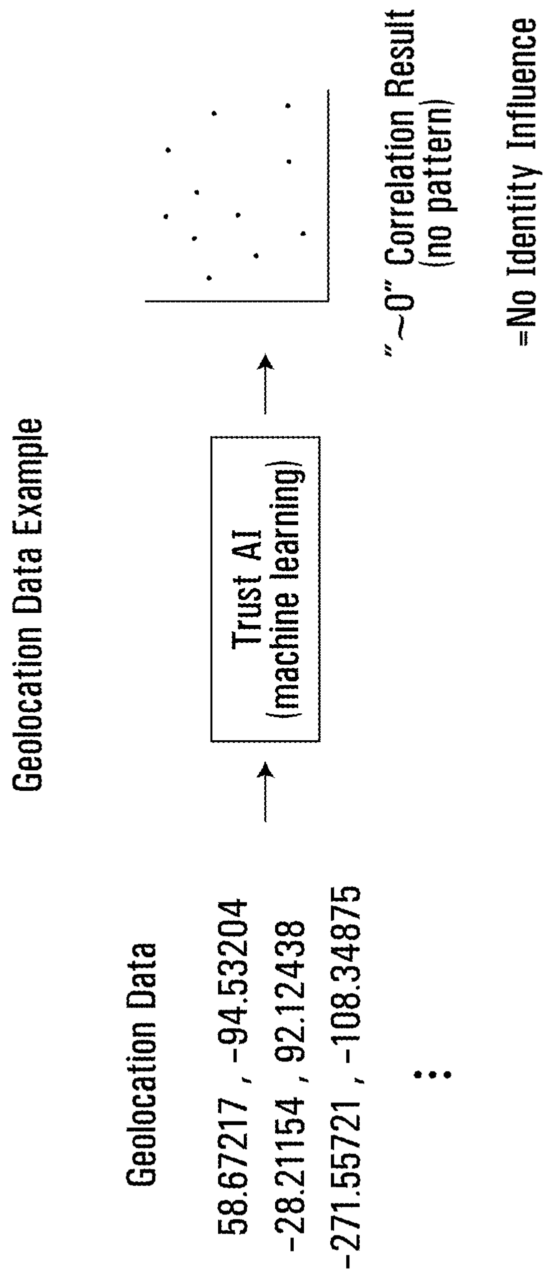
FIG. 9 is an example geolocation data chart that is utilized to assess grouping/correlation characteristics of geolocation data, according to some embodiments.

FIG. 9 is an example geolocation data chart that is utilized to assess grouping/correlation characteristics of geolocation data, according to some embodiments.

While geolocation data is shown, other data sources are possible, such as

Device Identifiers: A unique identifier associated with the device or application being used for the purposes of authentication. If a user typically uses the same set of devices to perform the same authentication events, this can be a good first indicator of a genuine or fraudulent authentication attempt.

Device Type: In addition to unique device/application identifiers, the type of device can be detected—Is the user logging in with an iPhone, Samsung Phone, Mac, PC, Tablet?

Device OS/Version: Which OS version is the device running? If a user previously logged in with an OS running 10.0.5, it is unlikely that they will login using the same device in the future running 10.0.3. Changes such as these could be an indicator of a fraudulent spoofing attack.

Browser/Version: Which browser is the user using for authentication? Do they always use Chrome? Is this authentication request suddenly coming from Safari?

Installed Plugins/Settings.

How has the user customized their browser? What plugins do they have installed? Do they allow cookies? These types of settings can help identify consistency from a user. A fraudulent attempt may be less likely to come from a browser with the identical configuration of the user.

Screen Resolution: What is the screen resolution of the device being used? This should normally be consistent/device for the user.

Geolocation: What geolocation data has been captured from the authentication events? Is this authentication request coming from a new location? Does the location match typical usage patterns for the time of day?

Geo-Velocity: How does this authentication's geolocation compare to recent authentication attempts? Is the user attempting to login in a location where it would be impossible to have traveled to in the time since their last location event?

Time of Day: What is the user's normal usage patterns based on the time of day? Are the applications or transaction types that are being authenticated in line with normal usage patterns for that user?

Day of Week: What is the user's normal usage patterns based on the day of week? Are the applications or transaction types that are being authenticated in line with normal usage patterns for that user?

Frequency: How often does the user typically perform a specific type of transaction? Is the user operating within normal usage/frequency patterns?

Nearby Peers: If the user is using a mobile device, for example, with an identity manager's Bluetooth SDK functionality, does the SDK detect nearby identity manager users? Users may frequently authenticate when within range of the same users—such as in an office environment. Does this authentication appear to fall within normal patterns?

Connected Devices What devices are typically connected to the user's phone during an authentication event—Are they connected to their Fitbit, Apple Watch, Car? Proximity to previously recognized devices can be a good indicator of identity.

Network Connection Patterns: What network is the user connected to? Does the user typically connect to the same set of networks when performing authentication? Is the user at home? At Work? At a coffee shop?

IP Address Reputation Does the IP address appear to be genuine—Are there any fraudulent flags associated with its address?

Phone Number: Has the user verified their phone number? This can be completed via SMS. Has the phone number association been validated through their telco provider?

Figure 10:
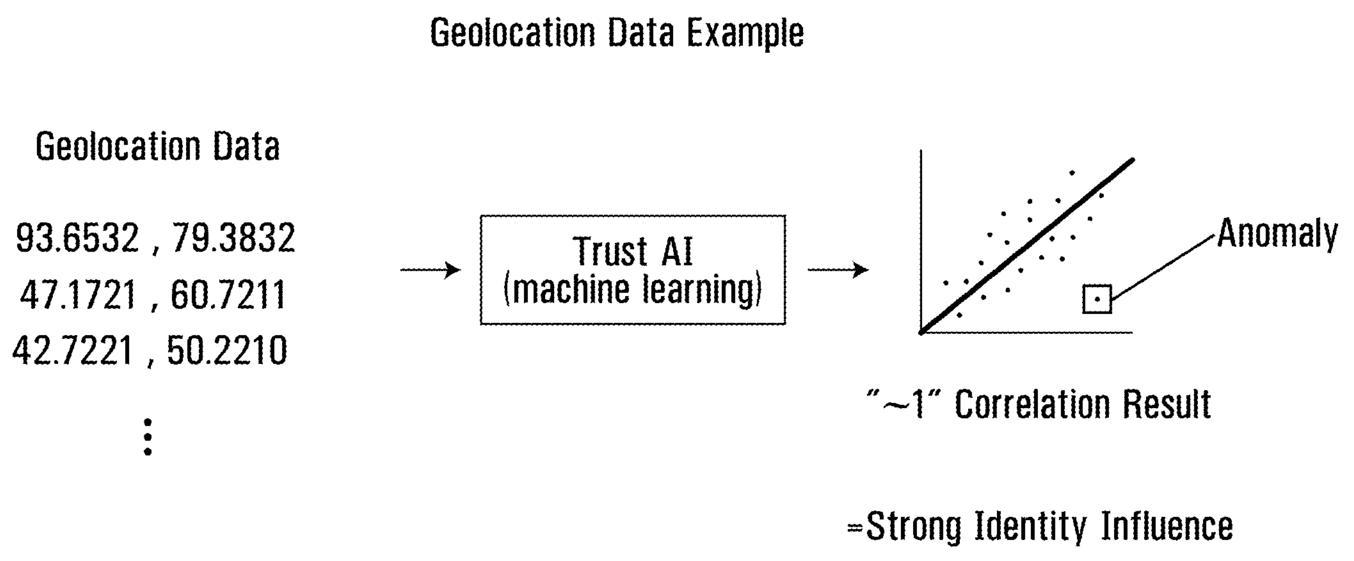
FIG. 10 is an alternate example geolocation data chart that is utilized to assess grouping/correlation characteristics of geolocation data, according to some embodiments.

FIG. 10 is an alternate example geolocation data chart that is utilized to assess grouping/correlation characteristics of geolocation data, according to some embodiments. In FIG. 10, the geolocation data has a strong correlation with one another, and a higher weighting is applied to geolocation data that matches the pattern as there is a stronger identity influence estimated based on the tracked data set over a period of time.

As illustrated in FIG. 10, geolocation data is utilized to assess a weight to be applied by a policy engine in accordance with an estimated strength of a link to identity.

For example—Geolocation data has a very strong link for someone who a follows consistent routine in life (Authenticates every day from the office or home), vs someone who travels consistently to varying locations. The system is more able to rely more on the geolocation data for someone who is consistent vs the traveller. The identity link represents those traits that follow predictable patterns—traits where we can identify anomalies when they occur. One of the primary techniques used is the Pearson Correlation Coefficient to calculate the strength of the correlation within behavioral biometric and contextual data captured about the user. Strong Positive (+1) or Strong Negative (−1) correlations strengthen a user's identity score as the sample size increases. Weak/No correlation (~0) do not provide any benefit for the Identity Score, and are indicative that particular metric will not be a significant influencer during the verification stage.

Figure 11:
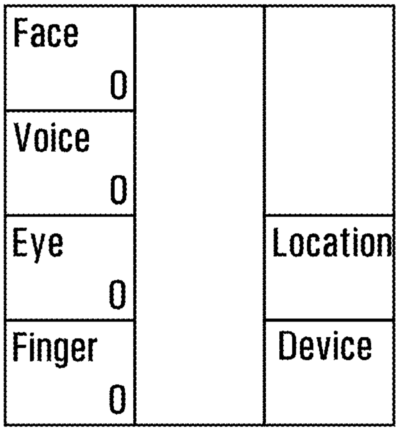
FIG. 11 is an example initial template, where no contextual information has been tracked yet, according to some embodiments.

FIG. 11 is an example initial template, where no contextual information has been tracked yet, according to some embodiments. The initial template is an empty data structure that awaits insertion of enrollments, as shown in FIGS. 12-15.

Figure 12:
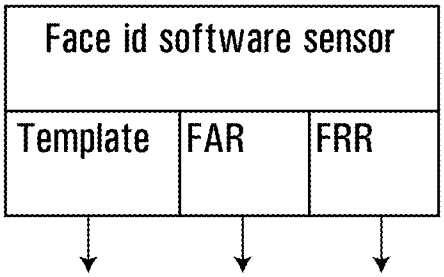
FIG. 12 is an example data structure relating to an activated face enrollment in a multifactor active biometric engine, according to some embodiments.
Figure 13:
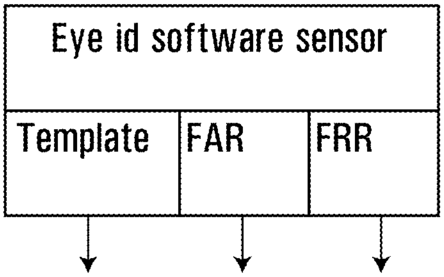
FIG. 13 is an example data structure relating to an activated eye enrollment in a multifactor active biometric engine, according to some embodiments.
Figure 14:
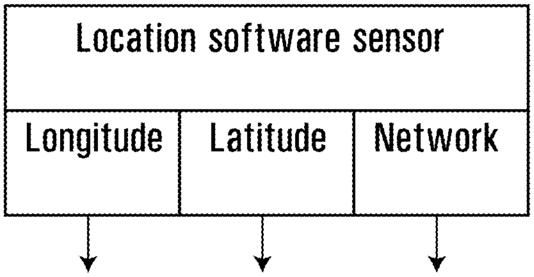
FIG. 14 is an example data structure relating to a location sensor in a multifactor active biometric engine, according to some embodiments.
Figure 15:
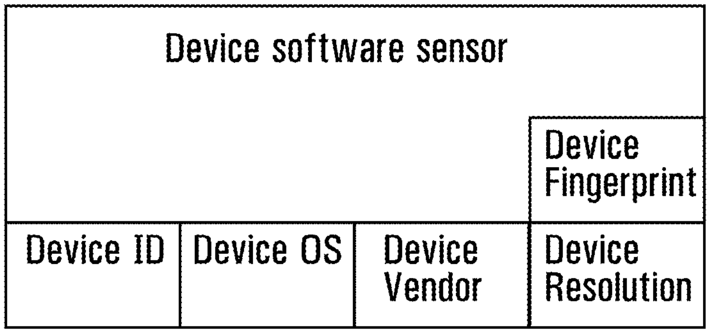
FIG. 15 is an example data structure relating to a device information tracker, according to some embodiments.

FIG. 12 is an example data structure relating to an activated face enrollment in a multifactor active biometric engine, according to some embodiments. In FIG. 12, there are two scores generated, a maximum score and a score based on the amount of information captured. A facial recognition enrollment is obtained, where an enrollment template is generated and stored based on a derivative of extracted facial features, for future enrollment. An initial false acceptance rate and a false rejection rate is associated with the modality, and the initial false acceptance rate and a false rejection rate may be updated over the course of time to reflect actual false acceptance rates and false rejection rates as more information becomes available. FIG. 13 is an example data structure relating to an activated eye enrollment in a multifactor active biometric engine, according to some embodiments. FIG. 14 is an example data structure relating to a location sensor in a multifactor active biometric engine, according to some embodiments. FIG. 15 is an example data structure relating to a device information tracker, according to some embodiments. Information is tracked, and maintained, for example, including device identifier, device operating system, device vendor, device resolution, among others. These may be stored in various data records for future retrieval and traversal. Biometric modalities and sensors located on the device may all be associated with the device-specific information for future correlation analysis with other modalities.

Figure 16:
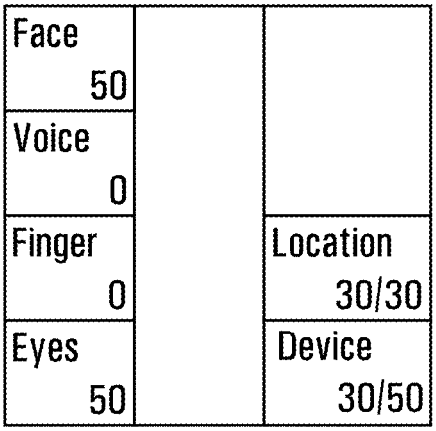
FIG. 16 is an example data structure showing a basket of available modalities and confidence scores associated with successful challenges thereof, which are utilized to generate confidence scores that are utilized to meet identity challenges, according to some embodiments.

FIG. 16 is an example data structure showing a basket of available modalities and confidence scores associated with successful challenges thereof, which are utilized to generate confidence scores that are utilized to meet identity challenges, according to some embodiments. While each contextual identity attribute stored within the identity template may holds little influence on their own, when all attributes are compounded together the identity impact and accuracy is very strong. Similar to behavioral data, the contextual data stored within the identity template becomes more fulsome and useful with use over a period of time.

Not all contextual data will be a significant influencer of each user's identity—This largely depends on the user's actions and patterns around authentication. Most people live habitual lives, which means they are easy to predict and detect when behavior is normal, given enough historical data. In these situations, there may be a high level of clustering and detect anomalies may be highly suggestive of fraudulent usage. However, for users that do not live habitual lives, the platform detects that there is little clustering in the data and accordingly, does not place much weight to detected anomalies.

A number of data sources can be utilized to capture contextual Identity data—Including but not limited to:

Health Data: While health data isn't as strong of an identity indicator as other factors, they can still be an indicator of identity when enough data is analyzed.

Examples include:

Steps taken per day (And at what time of day)

Resting Heart Rate

Verifying Identities—Confidence Scores

When a verification of identity occurs, the platform responds with a confidence score after performing the comparison against a user's identity template. The confidence score is measured by the strength of correlation with the previously captured data stored within the template. An evaluated identity score in considered in generating a confidence score result. For example, if a user closely matches the data stored within a template, but there isn't enough historical data, the confidence score can remain low. The identity verification may, in some embodiments, require enough strong correlating historical data to respond with a strong confidence score, otherwise additional biometric challenges may be issued.

A confidence score can be measured according to the following scale:

Confidence Score Definition

>95% Extremely Strong Match.

85-95% Strong Match.

60-85% Match.

50-60% Weak Match.

35-50% Fail 20-35% Strong Fail.

0-20% No Correlation

Figure 17:
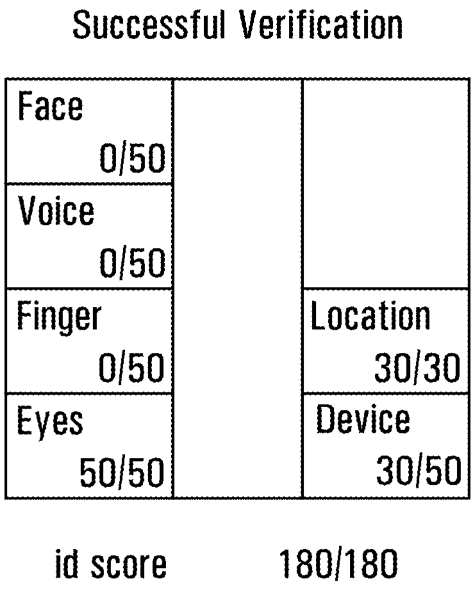
FIG. 17 is an example data structure being utilized for a successful verification, according to some embodiments.

FIG. 17 is an example data structure being utilized for a successful verification, according to some embodiments. As provided in FIG. 17, the initial template has no information. A logical representation having initial values is provided, and missing values may be populated as 0 with a number of empty lists and vectors.

FIG. 18 is an example listing of confidence score in the context of a comparison against a required confidence score, according to some embodiments. In the example of FIG. 18, a verification request was conducted where a required confidence score was 50% (e.g., representing a medium risk authentication). A biometric modality is selected, along with a contextual factor (geolocation). A total score of 80 is generated, and reduced to 64 due to correlation and other contextual factors that reduce the trustworthiness of the location score.

Figure 19:
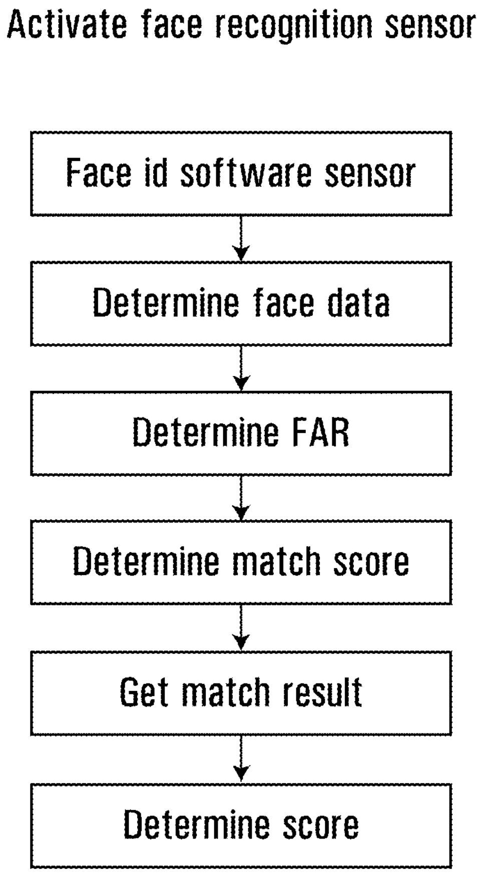
FIG. 19 is an example process indicating the generation of a confidence score, according to some embodiments.

FIG. 19 is an example process indicating the generation of a score, according to some embodiments. The confidence score is established by way of successive verifications, in this example, a facial recognition is utilized and the false acceptance rate is utilized to determine a baseline confidence score associated with a successful verification. The match score is generated by reducing weightings associated with potential issues, such as poor enrollment, pattern anomalies, among others, and a contribution to the confidence score is derived for the successful facial recognition.

FIG. 20 is an example weighted confidence score where a successful result is modified in view of match deviations, according to some embodiments. Building on the example of FIG. 19, a matching score may be indicative of a deviation relative to the veracity of prior matches. The deviation, in this example, is utilized to decrease the total contribution to the confidence score.

Figure 21:
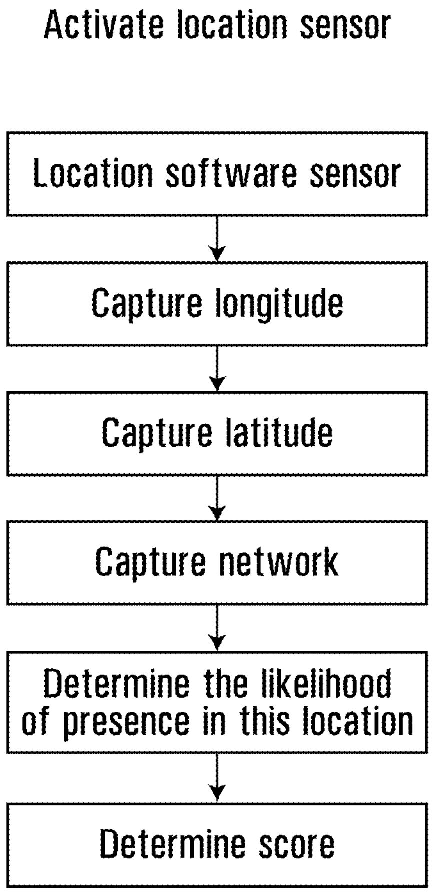
FIG. 21 is an example process where a contextual location is utilized to modify a confidence score, according to some embodiments.

FIG. 21 is an example process where a contextual location is utilized to modify a confidence score, according to some embodiments. In this example, the location sensor is utilized to track contextual factors, and the determined longitude, latitude, and proximate communication networks (e.g., SSID list, listing by signal strength).

FIG. 22 is an example enhanced structure whereby the geolocation likelihood modifies the confidence score, according to some embodiments. The likelihood of being a particular location is indicated as 50%, and despite having a full set of geolocation coordinates at a particular location, the score is reduced by half to 15.

Figure 23:
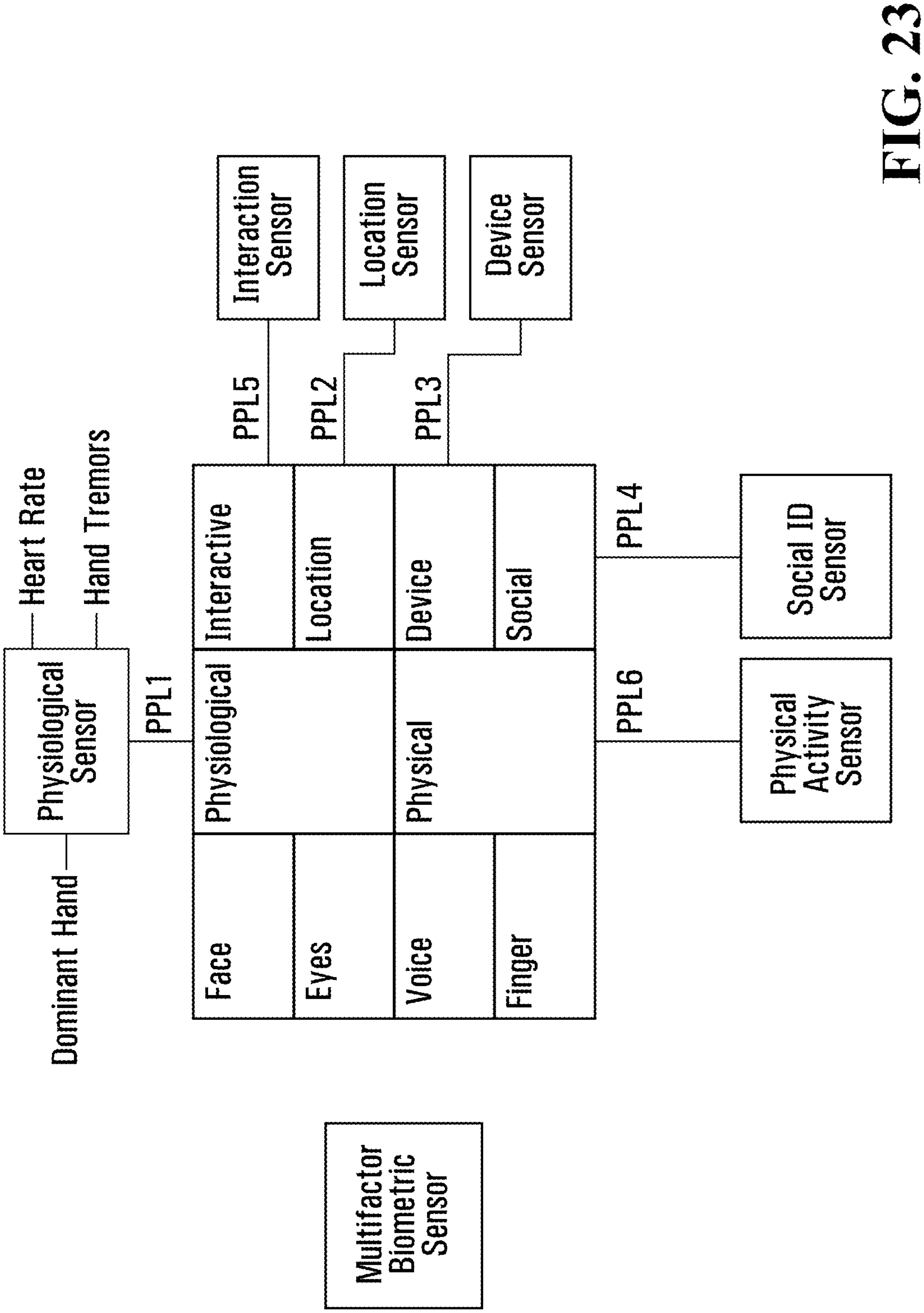
FIG. 23 is an example block schematic illustrating parallel processing and various processing pipelines, according to some embodiments.

FIG. 23 is an example block schematic illustrating parallel processing and various processing pipelines, according to some embodiments.

In some embodiments, a number of different processing pipelines are utilized, as there may be a general processing pipeline and other, more specialized pipelines. Specialized processing may be conducted based on differences in types of data, such as time-series or discrete event encoded data, improving processing performance by utilizing optimized network connections and/or processing resources.

For example, time-encoded data may be received in a continuous stream, and processing may be required to preprocess a time-series information set that is ready for statistical processing (e.g., to generate a rolling or moving average), etc. Geolocation data may be utilized to track regional clustering, and similarly keyboard dynamics may need processing to generate aggregate information regarding keyboard events.

In some embodiments, approaches, such as determining Gaussian distributions are utilized to build an identification of a normal behavior of the person, and if a new event comes is received, the Gaussian distribution is compared against to identify what is not normal.

Figure 24A:
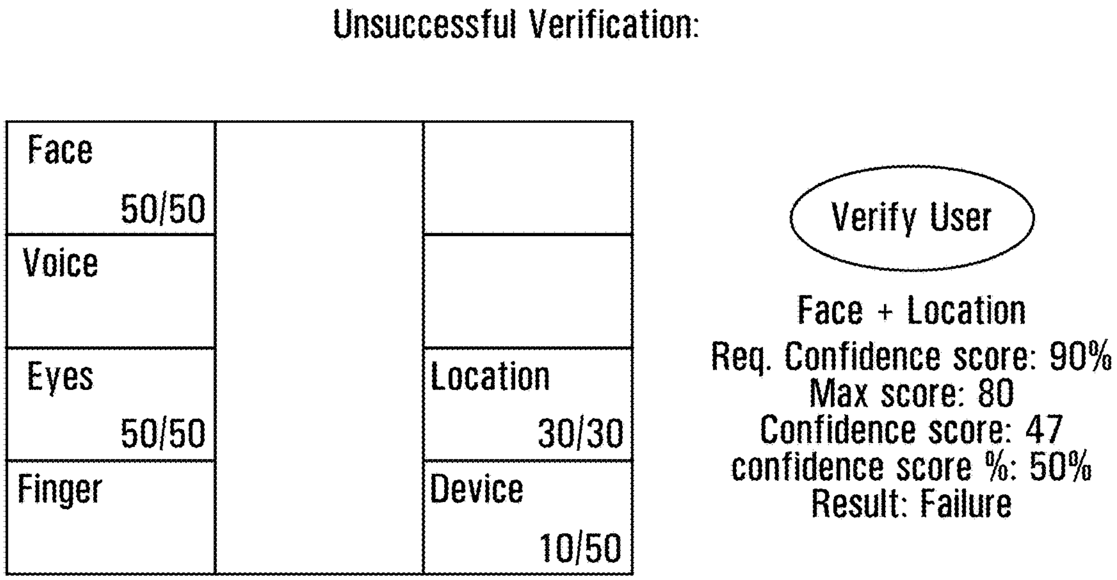
FIGS. 24A and FIG. 24B illustrate an example unsuccessful overall verification, according to some embodiments.
Figure 24B:
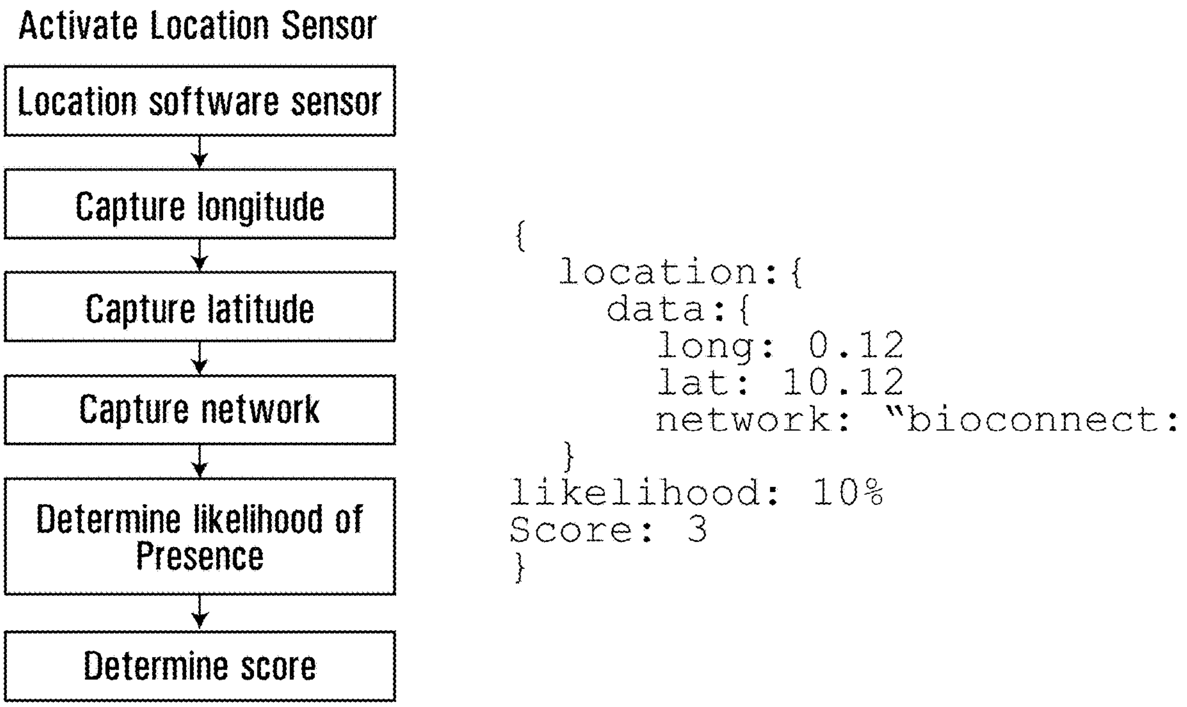

FIGS. 24A and FIG. 24B illustrate an example unsuccessful overall verification, according to some embodiments. In this scenario, despite having various enrollments and successful individual responses to biometric challenges, the system, based on contextual factors, reduces an adapted confidence score significantly and the contributions are not enough to overcome the deficiencies automatically weighted for by the system.

An example is described below having regard to a sample online banking transaction (Commercial Banking—Wire Transfer):

In a traditional implementation, A user logs into their online business banking account to transfer a large sum of money ($1,000,000). To complete this transaction, they must use a second factor—an security token. This security token generates a passcode that the user must enter into their browser to authenticate the transaction. Unfortunately, the user doesn't always carry their token on them, causing this to be an inconvenience. In addition to the lack of convenience, the size of the transaction causes the user to also have to call their bank to verify their identity and intent verbally. The primary reasoning behind these steps is that while a security token provides some additional assurance of the user's identity, it does not actually link to the identity of the person themselves. The bank is forced to take additional measures to match the amount of identity verification with the level of risk associated with the transaction. When the user verifies their token number, the backend service confirms that the 6-digit code is correct In an improved use case using the system of some embodiments, a user logs into their online business banking account to transfer a large sum of money ($1,000,000). To complete this transaction, they must confirm their identity using their biometrics through a mobile application connected to the identity management system. Because the user carries their mobile phone with them throughout the day, this is a convenient option.

The user clicks approve on the $1,000,000 through their browser. This request is sent to identity management system's cloud service through integrated APIs where the transaction risk requirements are reviewed. Based on the high level of risk, the identity management system reviews the user's identity template, and compares the data it received along with the authentication request.

This user has been a customer for over a year and performs transactions regularly. With this data the identity management system has created a very detailed template around their patterns of authentication.

Upon assessment of the data, the identity management system automatically determines that the contextual and behavioral data previously captured for the user strongly matches with the behavior the user is exhibiting today. This alone build's identity management system estimated confidence in the identity of the user. The identity management system assesses that a single active biometric verification will give the remaining required confidence to allow the transaction to continue. The time taken for the application to perform this assessment is <1 second.

The identity management system pushes a notification to the user's mobile phone, and they perform an active eye verification. The result of this match is sent back to the server, which satisfies the minimum confidence score for the transaction. The successful response is returned to the online banking application, and the transaction proceeds.

The additional assessment of the user's behavioral and contextual data eliminated the need for the user to have to call their bank representative of verify the transaction. The bank is receiving a strong enough confidence score to have assurance in the identity of the user.

In a scenario where the single active biometric modality wasn't enough to satisfy the minimum confidence score requirements, a second active modality could be requested.

The following use cases describe onboarding scenarios, where the improved system aids in streamlining the onboarding process.

In a traditional approach, while not limited to a banking scenario, consider a user who enters a branch to open a new account at a bank they haven't interacted with before. As the bank does not have a prior record for the user—the bank will perform some identity checks likely to include two pieces of government ID. The bank will validate these documents by looking at the printed picture on the face of the card and will store these on file. A bank may also require a credit check and to capture the user's social insurance number.

While some of these steps have multiple purposes, they are also used to verify the user's identity. The issue with these methods is that they don't directly link to the user as a person—A picture is really the only component that the bank uses to visually tie the user to the documents, and these can be easily forged.

In the improved system, a user walks into a bank to open an account, and the bank can do a cross verification of their identity against the identity management system. This identity management system could exist as a centralized service that is agnostic to the application or vendor—enabling a single identity and template to exist cross-platform, and cross-organization.

While the user doesn't have any records at this particular bank, they have been a long term client of a competitor bank who also leverages identity management system authentication. Throughout his years at the competitor, a very large, strong, identity management system template has been created. This template is full of his active biometrics, behavioral biometrics and contextual data. This data has strong pattern correlations resulting in a strong identity score. This makes it easy for the user to assert his identity to the new bank.

When he goes to open an account, he performs a validation of his biometric identity through a comparison against the data stored within the identity management system. This results in a strong confidence score for the bank and eliminates the guesswork from the Traditional Use Case. The new bank has now established a direct link to his identity management system identity, and can use this (and contribute to it) whenever authentication is required.

Given the digital nature of the identity management system authentication, authentication also enables the bank to expand their ability to allow customers to open accounts online. The identification of the user can occur in-branch or online and achieve the same level of effectiveness.

The following is a scenario of continuous authentication.

Traditional authentication systems act like a "gatekeeper". Once a user passes the initial stage of authentication, you now have access to the application. Sometimes, an inactivity timeout will be implemented to automatically log you out after a period of time. The improved system is configured to add additional protection by continuously monitoring the user's interaction throughout the course of the login session. This increases the security of the application because it ensures the identity of the user remains constant and protects against malicious interception.

An example of this type of continuous authentication could be an office worker who arrives at his office and uses the identity management system to biometrically authenticate at the front door. He then approaches his desk to login to his PC—because identity management system identifies this login as a normal pattern for the user (after he recently authenticated into the office), the level of authentication to login to the PC is simplified—Instead of requiring two factors of authentication, the user is able to complete the login with only one.

Once the user logs in, his interaction with the PC is monitored in the background to look for common usage patterns-such as his typing patterns and mouse interaction. These factors play a strong role in identity verification because their patterns are tightly correlated for each user. Later in the morning the user leaves his PC unattended and a colleague sits down and begins to use the PC which currently still has an open session. The PC notices a drastic change in typing and mouse interaction patterns, and prompts the user for a re-verification.

If the genuine user had attempted authentication elsewhere in the office (such as a physical access door), the identity management system could use that information to determine if a higher degree of authentication is required given the open session on the PC, or could have locked the PC to prevent fraudulent user access.

Figure 25:
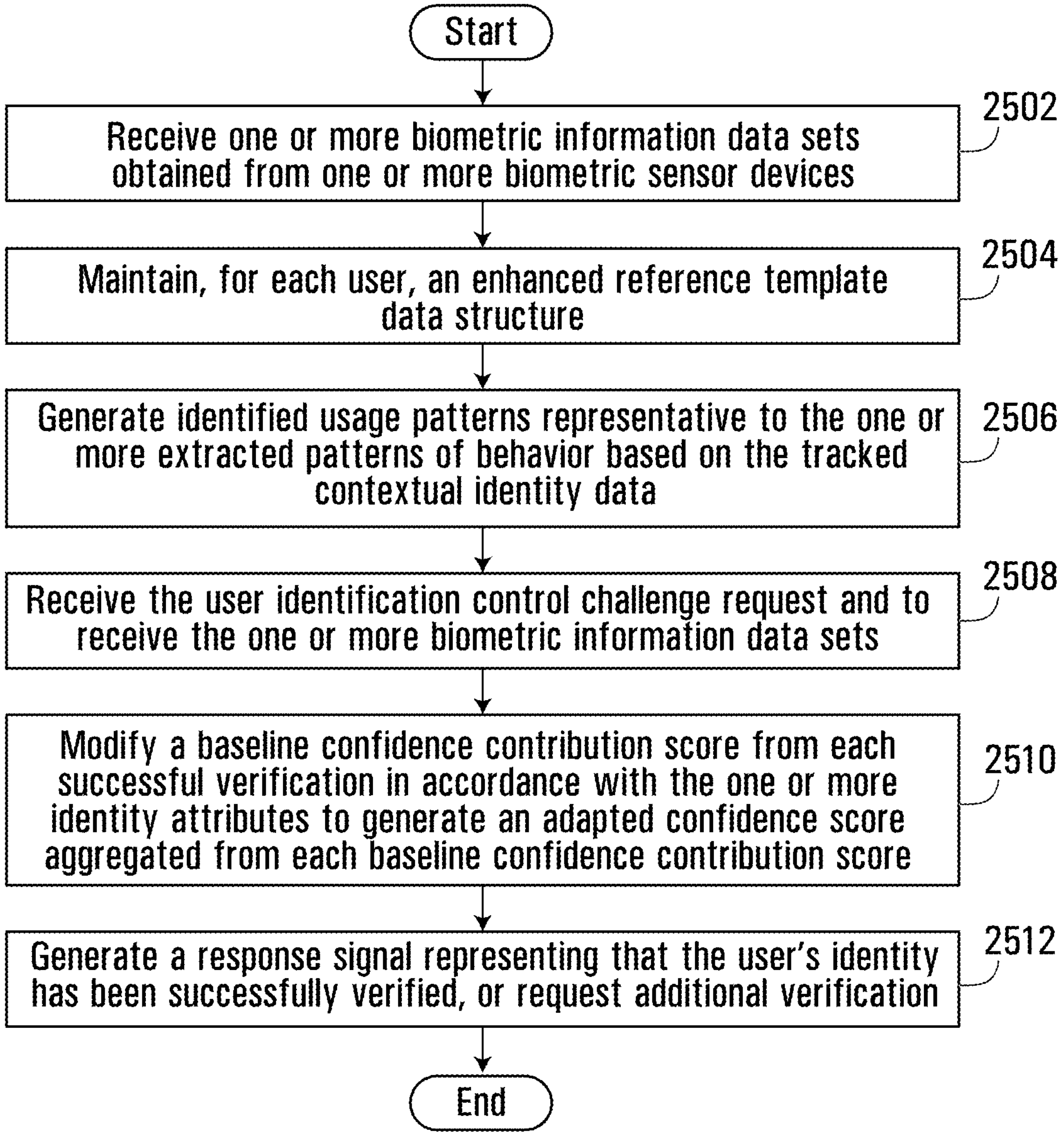
FIG. 25 is an example method for biometric verification, according to some embodiments.
Figure 26:
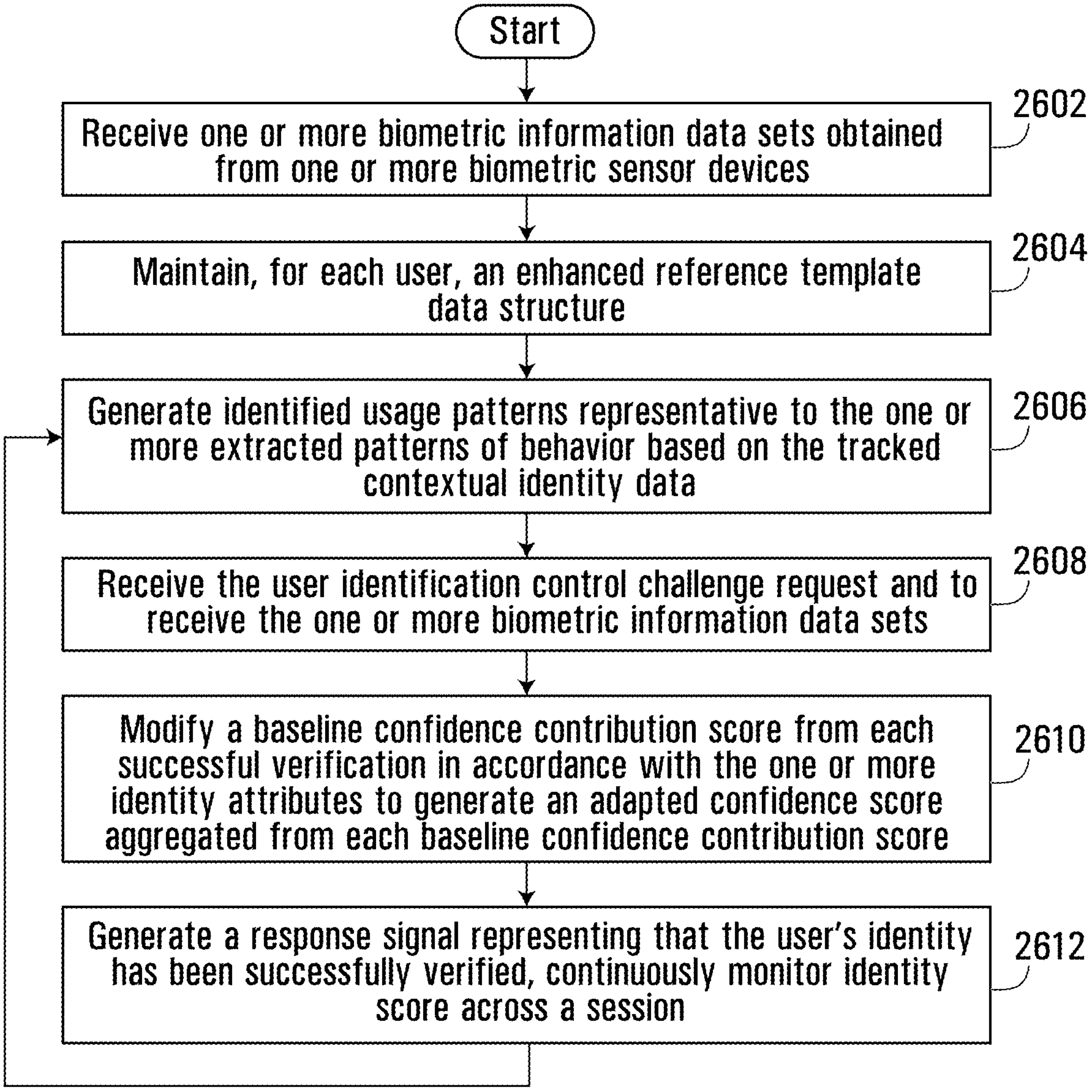
FIG. 26 is an alternate example method for biometric verification, according to some embodiments.

FIGS. 25 and FIG. 26 are method diagrams illustrating sample steps of a method for improved authentication and/or verification, according to some embodiments.

In FIG. 25, a computer implemented method is described for adaptive biometric verification in relation to the identity of one or more users in response to an user identification challenge request based on one or more extracted patterns of behavior, the method including, at 2502, receiving one or more biometric information data sets obtained from one or more biometric sensor devices, and at 2504, maintaining, for each user, an enhanced reference template data structure recording at least (i) biometric template data based on previous received biometric information data sets, (ii) tracked contextual identity data, and (iii) identified usage patterns based on the tracked contextual identity data.

At 2506, the method includes generating identified usage patterns representative of the one or more extracted patterns of behavior based on the tracked contextual identity data to generate one or more identity attributes associated with each tracked contextual identity data type, the one or more identity attributes representative of a relationship with tracked user profile information stored on the enhanced reference template data structure, and at 2508, receiving the user identification control challenge request and receiving the one or more biometric information data sets.

Upon each successful verification against the biometric template data maintained on the enhanced reference template data structure, the method includes, at 2510, modifying a baseline contribution score from each successful verification in accordance with the one or more identity attributes to generate an adapted confidence score aggregated from each baseline contribution score; and at 2512, responsive to the adapted confidence score exceeding a required confidence score threshold, generating a response signal representing that the user's identity has been successfully verified.

FIG. 26 has similar steps 2602, 2604, 2606, 2608, 2610, and 2612 as FIG. 25, and FIG. 26 further includes a loop step whereby the adapted confidence score is continually updated and checked against exceeding a threshold to provide for continuous authentication across a duration of time. In the context of a continuous authentication across a session, the updating may be throughout the session. In the context of a latent, on-going passive authentication, a confidence score may be maintained periodically as the user conducts the user's day to day activities.

Figure 27:
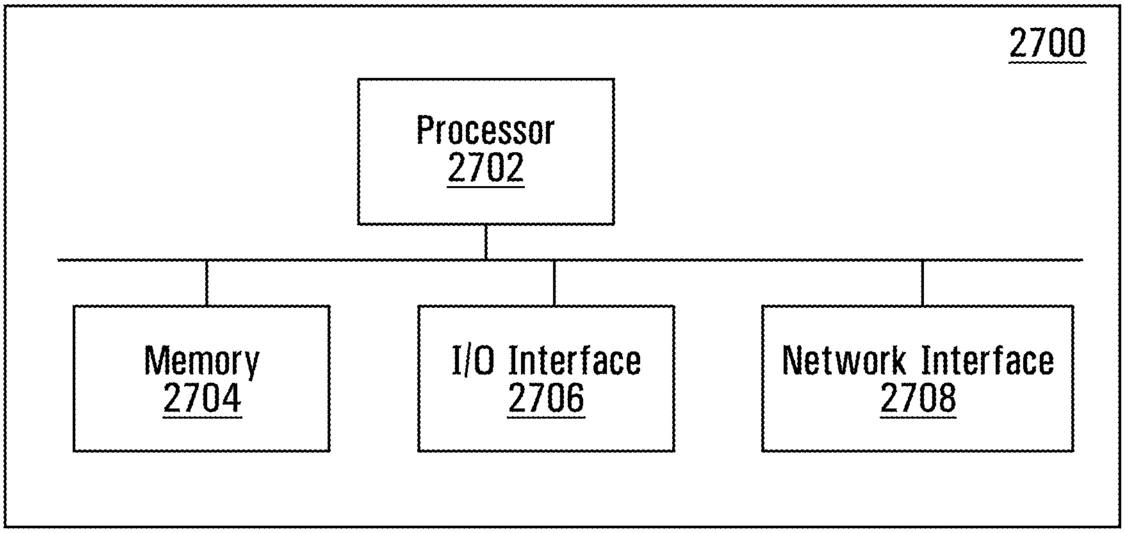
FIG. 27 is an example computing device, according to some embodiments.

FIG. 27 is a schematic diagram of computing device 2700, exemplary of an embodiment. As depicted, computing device includes at least one processor 2702, memory 2704, at least one I/O interface 2706, and at least one network interface 2708.

Processor 2702 may be an Intel or AMD x86 or x64, PowerPC, ARM processor, or the like. Memory 2704 may include a suitable combination of any type of computer memory that is located either internally or externally such as, for example, random-access memory (RAM), read-only memory (ROM), compact disc read-only memory (CDROM), or the like.

Each I/O interface 2706 enables computing device 2700 to interconnect with one or more input devices, such as a keyboard, mouse, camera, touch screen and a microphone, or with one or more output devices such as a display screen and a speaker.

Each network interface 2708 enables computing device 2700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 2700 is operable to register and authenticate users (using a login, unique identifier, and password for example) prior to providing access to applications, a local network, network resources, other networks and network security devices. Computing devices 2700 may serve one user or multiple users.

In some embodiments, the system 100 is provided in the form of a special purpose device, optimized for performance in relation to handling authentication inquiries and controlling the requesting of biometric challenge verifications by one or more users. The special purpose device may be provided in the form of a rack-mounted appliance physically located at one or more data centers, having networked interface connections for communications to one or more downstream systems, biometric sensory devices, and/or user devices.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term “connected” or “coupled to” may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

Pseudocode Examples

Device ID:

```
Persistent authenticator id
Get unique application identifier
Unique application identifier is used to identify application installation.
Data Structure: {
UniqueHash
ApplicationUniqueID
}
Pseudocode: {
Application generates a unique hash using SHA-256
Application requests a unique id from the operating system and
stores it inside the data structure.
If unique id is not available from the operating system, application
generates a unique id, using UUID, time of installation, and secure
random number
}
Get mac address
Mac Address of a device does not change and remains consistent
throughout the life time of the device. This property allows bioconnect.id
to check if the device has changed users.
Data Structure: {
NetworkSubsystemInfo,
RoutingTableInfo,
LinkLayerInfo,
ListOfConfiguredInterfaces
}
Pseudocode: {
Get information from the device using operating system framework
Copy link layer information into a buffer
Extract mac address from the information copied to the buffer
Combine the two ids to make the identification stronger
Datastructure: {
CombinedID
}
Pseudocode: {
Hash mac address, network subsystem info, and unique application
identifier information using SHA-256
```

Device Type:

```
Version of the device
Kind of device
Vendor of the device
Datastructure: {
DeviceVersion,
DeviceKind,
DeviceVendor
DeviceScreenSize
}
Pseudocode:
Call operating system specific method to get device
version, device kind and device vendor.
DeviceVersion = Device.getVersionCode.split(":").first
DeviceKind = Device.getType
DeviceVendor = Device.getVendor( )
DeviceScreenSize = Device.getScreenBounds.width + "x" +
Device.getScreenBounds.height
```

OS Version:

```
Operating system version of the authenticator
Datastructure: {
OperatingSystemName,
OperatingSystemVersion,
OperatingSystemUpdateDate
}
Pseudocode:
OperatingSystemInfo = Device.getOperatingSystemInfo( )
OperatingSystemName = OperatingSystemInfo.getSystemName( )
OperatingSystemVersion = OperatingSystemInfo.getSystemVersion( )
OperatingSystemUpdateDate = OperatingSystemInfo.getUpdateDate( )
```

IP Address;

```
Authenticator gets the IP address information from the operating system and posts it inside context which is attached to every request and response to the server. The server looks up the IP address of the request and stores it as well.
  Datastructure: {
    IPAddressOnDevice,
    IPAddressOnServer
    }
  Pseudocode:
  Authenticator collects ip address on the device in a context
  Context[IPAddressOnDevice] = Device.getIPAddress( )
  Authenticator posts context to the server on each request
  Server looks up the IP Address in the request
  Server stores the IP Address in the request inside the context
  Context[IPAddressOnServer] = Request.getIPAddress( )
```

Frequency of Authentication:

```
A user has a pattern of number of authentication it will do in a day, week, month and a year. Storing the frequency of the authentications over day, week, month allows the server to create patterns on frequency. Timeseries data is stored in database and analyzed using algorithms which can forecast future authentication events. This is done by getting the baseline of the data, trend, seasonality and variance of the data.
  Datastructure {
  Timeseries datastructure
  Timeseries summary
  Timeseries forecast
  }
  Pseudocode:
  For every new timeseries event
  Record the event in a timeseries buffer (based on a configurable window)
  Run the timeseries summary algorithm, which calculates variance,
maximum, minimum, trend, correlation etc.
  Forecast next n (configurable) timeseries events
  For every authentication event, calculate the distance between baseline and the
current event. If the event is farther than a configurable threshold reduce the
confidence score.
```

Time zone Settings:

```
This is the timezone in which the user is performing all the events.
Timezone is gathered from the authenticator operating system.
  Datastructure {
  Timezone
  }
  Pseudocode:
  Timezone = Device.TimeInfo.getTimeZone( );
```

Social Intelligence:

```
Users in server can store their social network credentials, which can be used to
look up status of individual user. If a user who was initially located in Canada who then
moved to China with the social feed showing content location in China, then a
authentication done from China will have lower probability of being fraudulent.
  Datastructure {
  SocialFeed {
  SocialFeedEvent {
  SocialFeedEventLocation
  SocialFeedEventTimestamp
  SocialFeedData
  PreviousSocialEvent
  NextSocialEvent
  }
  Pseudocode
  For each social network in user profile
```

-continued

```
Get the social feed
Parse the social feed events, transform and save them in the
SocialFeedEvent structure
On each authentication event, check the last social event location
If the locations are further than a configurable threshold, reduce the
confidence score.
```

Proximity of Users (Invisible Network):

```
Using the low energy communication channels such as Bluetooth, and the location
information of the user. The server can detect if other users are close by, (configurable
radius).
Datastructure: {
GraphOfPeers {
ListOfConnectionEdge {
WeightOfTheEdge
UserNodePointer1
UserNodePointer2
}
ListOfUserNodes
}
Pseudocode:
At invocation of identity management application or at regular intervals
Post the location of the authenticator
Get identity management users nearby
Search for identity management users using Bluetooth
Update GraphOfPeers
On an authentication event
Determine type of the authentication event based previous data
Run graph similarity algorithm on the current graph and GraphOfPeers
If the graphs are dissimilar reduce the confidence score.
```

Geolocation:

```
Device geolocation coordinates via GPS and pattern of geolocation. Geolocation data
is captured over time to determine the likely hood of authentication taking place within
a geographic zone.
Datastructure : {
GeolocationCoordinatesList
Geolocation {
Longitude
Latitude
}
}
Pseudocode:
Identity management service stores geolocation information and creates a
geographic region with probability of presence, during the training phase.
At every authentication event
Identity management application posts geolocation data to Identity
management service
Identity management service checks the geolocation against the
geographic region with probability presence. If the geolocation falls in a
low probability zone, reduce the confidence score.
Identity management service updates the geographic region with
probability presence if other attribute weights are higher and confidence
score from those attributes is above a configurable level.
```

Geo Velocity:

```
Detecting how fast a user's location is changing. Geolocation data is
used to calculate improbable changes in users geographic location.
Datastructure: Same as geolocation
Pseudocode:
On an authentication event, store the current geolocation (longitude, latitude)
Calculate the earth distance by running distance calculating formula on
current geolocation and last geolocation.
Calculate the time between two authentication events.
Compare the geovelocity to configurable geovelocity threshold
If the geovelocity is higher than the threshold, lower the confidence score
```

Device Co-Location:

```
Closeness and proximity to devices using low energy channels or
geolocation
Datastructure: {
GraphOfPeerDevices
{
Devices {
DeviceIdentifier
DeviceVendor
DeviceModel
DeviceAddress
}
Connection (Edge) {
LastEstablishedConnection
Weight
}
}
}
Pseudocode:
On invocation or regular interval of Identity management Application
session
Search for devices in the region
Post the device list in the region to the Identity management service
Identity management service intersects the list of devices with
GraphOfPeersDevices
If the intersection results in empty set, confidence score is not increased.
```

Phone Number Verification:

```
Phone # verification is used to make sure that user has a valid phone
number in the profile.
Datastructure: {
PhoneNumber,
LastVerification,
LastVerificationStatus
LastVerificationService
LeaseDuration
}
Pseudocode
Admin or policy triggers a phone number verification request
OTP is generated by Identity management service
OTP is sent to the authenticator/device through SMS
User opens up Identity management application and enters the SMS
code
Identity management application posts the SMS code to Identity
management service
Identity management service compares the posted code with the
generated code
If posted code and generated code are the same, phone number of the
user in profile is verified.
LeaseDuration in seconds is added to the verification, after which the
user will have to verify the phone number again.
```

Browser Type:

```
List of most used browsers
Datastructure : {
ListOfBrowserInfo {
BrowserName
FrequencyOfUse
}
}
Pseudocode
An Integration/Client of Identity management captures browser
information and posts it along with the verification request.
Identity management updates its list of browsers for the user and the
frequency.
If the browser is not supported, (e.g., Internet Explorer 6) known for
bugs and vulnerabilities or
never seen before, confidence score maybe reduced.
```

Installed Fonts:

```
List of installed fonts
Datastructure : {
ListOfInstalledFonts {
FontName
FontVersion
}
}
Pseudocode
An Integration/Client of identity management may capture installed
fonts information from users computer and post it to identity
management service.
If the font set changes beyond a configurable threshold, confidence
score maybe reduced.
```

Screen Resolution:

```
List of screen resolution with frequency
Datastructure : {
ListOfScreenResolution {
ScreenResolution {
WidthInPixels
HeightInPixels
Frequency
}
}
Pseudocode
WidthInPixels = Device.ScreenResolution.width( )
HeightInPixels = Device.ScreenResolution.height( )
If the screen resolution is present in the list, update the frequency by 1
Otherwise create a new screen resolution structure
Confidence score maybe reduced if this is a new screen resolution
```

Browser Plugins:

```
List of browser plugins installed on a system
Datastructure : {
ListOfPlugins {
Plugin {
Name
Version
}
Integration or client of identity management system may collect
information about browser plugins installed on a users system and post
that information to identity management service.
If there are plugins which have known vulnerabilities then the
confidence score may be reduced.
```

Language:

```
Language of the device/authenticator
Datastructure: {
Language
}
Pseudocode:
Language = Device.LanguageSetting.language( )
```

Network Connection Patterns:

```
Network connection types over lifetime of the user interactions
Datastructure : {
ListOfNetworkConnections {
NetworkType
NetworkBlockAddress
}
}
}
```

-continued

```
Pseudocode
Get network information from the device using operating system
framework
Copy network information into datastructure
```

Transaction Type:

```
Store transaction type and value information
Datastructure : {
TransactionType
TransactionId
TransactionValue
}]
```

What is claimed is:

1. A central adaptive identity verification system for provisioning identity verification in relation to an identity of one or more users, the system automatically adapting user identification decisions to a local user identification control challenge request, the central adaptive identity verification system comprising:

one or more local computing devices each having a local computer memory, a local processor and one or more local identity sensor devices, the local processor is configured to receive one or more local identity information data sets obtained from the one or more local identity sensor devices and receive the local user identification control challenge request, and upon each attempted verification of attempted verifications of the one or more users at a local computing device of the one or more local computing devices against identity template data stored within the local computing device corresponding to a specific user of the one or more users, modify an adapted local confidence score aggregated from each contribution of adapted local confidence scores corresponding to the one or more users to the adapted local confidence score from each of the attempted verifications at the one or more local computing devices, wherein each of the contribution to the adapted local confidence score from each of the attempted verifications is tuned based on at least one of a false rejection rate or a false positive rate associated with a modality corresponding to each of the attempted verifications;

a central processor stored on a central computer memory configured to:

receive at periodic intervals from the one or more local computing devices the adapted local confidence scores, the one or more local identity information data sets and the local user identification control challenge requests associated with the identity template data of the one or more users;

modify an adapted central confidence score corresponding to the specific user of the one or more users aggregated from at least the adapted local confidence scores for the specific user received from the one or more local computing devices, transmit the adapted central confidence score for the specific user to a requesting local computing device upon the requesting local computing device receiving an identifier corresponding to the adapted central confidence score of the specific user stored within the central computer memory, the adapted central confidence score received by the requesting local computing device modifies or replaces the adapted local confidence score for the specific user stored within the local computer memory; and wherein the requesting local computing device generates a response signal representing an access provisioning signal for controlling an access control mechanism to request an additional user identification control challenge based on the modified or replaced adapted local confidence score exceeding or being below a required local confidence score threshold.

2. The central adaptive identity verification system of claim 1, wherein the identity template data and the one or more local identity information data sets are stored within a sanitized and redacted information container within the local computer memory.

3. The central adaptive identity verification system of claim 2, wherein the sanitized and redacted information container anonymizes the identity template data and the one or more local identity information data sets using one-way hash algorithms.

4. The central adaptive identity verification system of claim 1, wherein the one or more local computing devices are disparate computing systems or shared identity management systems.

5. The central adaptive identity verification system of claim 1, wherein the identifier corresponding to the adapted central confidence score of the specific user can be adduced by providing a hash-based token representative of an identity of the specific user and a linkage to a global identify of the specific user.

6. The central adaptive identity verification system of claim 1, wherein the one or more local computing devices are further configured to transmit to the central processor encapsulated data packets containing information, obtained from the attempted verifications of the one or more users, on at least one of breach events, false acceptances, false rejections, and pattern recognition information relating to the veracity of biometric modalities and contextual factors.

7. The central adaptive identity verification system of claim 1, wherein the adapted local confidence score is updated after each attempted verification, and wherein the local processor is configured to automatically trigger the additional user identification control challenge upon a determination that the adapted local confidence score has reduced below the required confidence score threshold.

8. The central adaptive identity verification system of claim 1, wherein the adapted local confidence score is periodically or continuously updated, and wherein the local processor is configured to automatically trigger the additional user identification control challenge upon a determination that the adapted local confidence score has reduced below the required confidence score threshold.

9. The central adaptive identity verification system of claim 1, wherein the adapted central confidence score is maintained as a data value on a central identity token data object associated with the specific user, the central identity token data object representative of an identity of the specific user.

10. A central adaptive identity verification method for provisioning identity verification in relation to an identity of one or more users, the method automatically adapting user identification decisions to a local user identification control challenge request, the central adaptive identity verification method comprising:

receiving, by a local processor of one or more local computing devices, one or more local identity information data sets obtained from one or more local identity sensor devices of the one or more local computing devices;

receiving, by the local processor, the local user identification control challenge request, and upon each attempted verification of attempted verifications of the one or more users at a local computing device of the one or more local computing devices against identity template data stored within the local computing device corresponding to a specific user of the one or more users, modifying by the local processor, an adapted local confidence score aggregated from each contribution of adapted local confidence scores corresponding to the one or more users to the adapted local confidence score from each of the attempted verifications at the one or more local computing devices, wherein each of the contribution to the adapted local confidence score from each of the attempted verifications is tuned based on at least one of a false rejection rate or a false positive rate associated with a modality corresponding to each of the attempted verifications;

receiving, by a central processor, at periodic intervals from the one or more local computing devices the adapted local confidence scores, the one or more local identity information data sets and the local user identification control challenge requests associated with the identity template data of the one or more users;

modifying, by the central processor, an adapted central confidence score corresponding to the specific user of the one or more users aggregated from at least the adapted local confidence scores for the specific user received from the one or more local computing devices, transmitting, through the central processor, the adapted central confidence score for the specific user to a requesting local computing device upon the requesting local computing device receiving an identifier corresponding to the adapted central confidence score of the specific user stored within a central computer memory that stores the central processor, the adapted central confidence score received by the requesting local computing device modifies or replaces the adapted local confidence score for the specific user stored within a local computer memory of the one or more local computing devices; and generating, by the requesting local computing device, a response signal representing an access provisioning signal for controlling an access control mechanism to request an additional user identification control challenge based on the modified or replaced adapted local confidence score exceeding or being below a required local confidence score threshold.

11. The central adaptive identity verification method of claim 10, further comprising storing the identity template data and the one or more local identity information data sets within a sanitized and redacted information container within a local computer memory.

12. The central adaptive identity verification method of claim 11, wherein the sanitized and redacted information container anonymizes the identity template data and the one or more local identity information data sets using one-way hash algorithms.

13. The central adaptive identity verification method of claim 10, wherein the one or more local computing devices are disparate computing systems or shared identity management systems.

14. The central adaptive identity verification method of claim 10, wherein the identifier corresponding to the adapted central confidence score of the specific user can be adduced by providing a hash-based token representative of an identity of the specific user and a linkage to a global identify of the specific user.

15. The central adaptive identity verification method of claim 10, further comprising transmitting, using the one or more local computing devices, to the central processor encapsulated data packets containing information, obtained from the attempted verifications of the one or more users, on at least one of breach events, false acceptances, false rejections, and pattern recognition information relating to veracity of biometric modalities and contextual factors.

16. The central adaptive identity verification method of claim 10, wherein the adapted local confidence score is updated after each attempted verification, and wherein the local processor is configured to automatically trigger the additional user identification control challenge upon a determination that the adapted local confidence score has reduced below the required confidence score threshold.

17. The central adaptive identity verification method of claim 10, wherein the adapted local confidence score is periodically or continuously updated, and wherein the local processor is configured to automatically trigger the additional user identification control challenge upon a determination that the adapted local confidence score has reduced below the required confidence score threshold.

18. A non-transitory computer readable medium, storing machine interpretable instructions, which when executed, cause a processor to perform a central adaptive identity verification operation for provisioning identity verification in relation to an identity of one or more users, the operation automatically adapting user identification decisions to a local user identification challenge request, the central adaptive identity verification operation comprising:

receiving, by a local processor of one or more local computing devices, one or more local identity information data sets obtained from one or more local identity sensor devices of the one or more local computing devices;

receiving, by the local processor, the local user identification control challenge request, and upon each attempted verification of attempted verifications of the one or more users at a local computing device of the one or more local computing devices against identity template data stored within the local computing device corresponding to a specific user of the one or more users, modifying by the local processor, an adapted local confidence score aggregated from each contribution of adapted local confidence scores corresponding to the one or more users to the adapted local confidence score from each of the attempted verifications at the one or more local computing devices, wherein each of the contribution to the adapted local confidence score from each of the attempted verifications is tuned based on at least one of a false rejection rate or a false positive rate associated with a modality corresponding to each of the attempted verifications;

receiving, through a central processor, at periodic intervals from the one or more local computing devices the adapted local confidence scores, the one or more local identity information data sets and the local user identification control challenge requests associated with the identity template data of the one or more users;

modifying, by the central processor, an adapted central confidence score corresponding to the specific user of the one or more users aggregated from at least the adapted local confidence scores for the specific user received from the one or more local computing devices, transmitting, through the central processor, the adapted central confidence score for the specific user to a requesting local computing device upon the requesting local computing device receiving an identifier corresponding to the adapted central confidence score of the specific user stored within a central computer memory that stores the central processor, the adapted central confidence score received by the requesting local computing device modifies or replaces the adapted local confidence score for the specific user stored within a local computer memory of the one or more local computing devices; and generating, by the requesting local computing device, a response signal representing an access provisioning signal for controlling an access control mechanism to request an additional user identification control challenge based on the modified or replaced adapted local confidence score exceeding or being below a required local confidence score threshold.

* * * * *